US012638961B2

(12) United States Patent
Han

(10) Patent No.: US 12,638,961 B2
(45) Date of Patent: May 26, 2026

(54) HUMAN-MACHINE INTERACTION METHOD AND APPARATUS, AND ELECTRONIC DEVICE

(71) Applicant: Honor Device Co., Ltd., Shenzhen (CN)

(72) Inventor: Xiao Han, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 335 days.

(21) Appl. No.: 18/577,103

(22) PCT Filed: Jan. 5, 2023

(86) PCT No.: PCT/CN2023/070780
§ 371 (c)(1),
(2) Date: Jan. 5, 2024

(87) PCT Pub. No.: WO2023/160271
PCT Pub. Date: Aug. 31, 2023

(65) Prior Publication Data
US 2024/0353979 A1 Oct. 24, 2024

(30) Foreign Application Priority Data
Feb. 28, 2022 (CN) .......................... 202210193754.8

(51) Int. Cl.
*G06F 3/0484* (2022.01)
*G06F 3/04817* (2022.01)
(52) U.S. Cl.
CPC ........ *G06F 3/0484* (2013.01); *G06F 3/04817* (2013.01)

(58) Field of Classification Search
None
See application file for complete search history.

(56) References Cited

U.S. PATENT DOCUMENTS

| 2014/0365892 A1 | 12/2014 | Jiang et al. | |
| 2015/0177922 A1* | 6/2015 | Poletto .................. | G06F 3/0488 |
| | | | 715/753 |
| 2017/0280200 A1 | 9/2017 | Sharma et al. | |

(Continued)

FOREIGN PATENT DOCUMENTS

| CN | 105100893 A | 11/2015 |
| CN | 105872810 A | 8/2016 |

(Continued)

*Primary Examiner* — Tuan S Nguyen
(74) *Attorney, Agent, or Firm* — Slater Matsil, LLP

(57) ABSTRACT

Embodiments of this application provide a human-machine interaction method and an electronic device. In the method, a first interface is displayed in a gallery application in response to a first operation of a user on a thumbnail that is of a video and that is displayed in a first album or a photo tab. A picture of the video is displayed in a display region of the first interface. The first interface further includes an association region and an operation region. The association region includes an identifier of the video and an identifier of at least one photo associated with the video. The at least one photo is generated based on the video. The operation region includes a share control. The video is shared with a target terminal in response to the user operating the share control.

20 Claims, 32 Drawing Sheets

(56) References Cited

U.S. PATENT DOCUMENTS

| | | | | |
|---|---|---|---|---|
| 2019/0082215 A1 | 3/2019 | Horiguchi | | |
| 2019/0158934 A1 | 5/2019 | Wang et al. | | |
| 2020/0099639 A1 | 3/2020 | Mcbeath | | |
| 2022/0076707 A1* | 3/2022 | Walker | .................. | G06V 20/41 |
| 2022/0326819 A1* | 10/2022 | Manzari | .................. | G06F 16/54 |
| 2022/0326823 A1* | 10/2022 | Fang | .................... | G06F 3/0481 |

FOREIGN PATENT DOCUMENTS

| | | | |
|---|---|---|---|
| CN | 105898520 A | 8/2016 |
| CN | 107704519 A | 2/2018 |
| CN | 108536365 A | 9/2018 |
| CN | 109542999 A | 3/2019 |
| CN | 110072071 A | 7/2019 |
| CN | 110460894 A | 11/2019 |
| CN | 110825289 A | 2/2020 |
| CN | 111857517 A | 10/2020 |
| CN | 113297505 A | 8/2021 |
| WO | 2021082639 A1 | 5/2021 |

* cited by examiner

CONT. FROM FIG. 1A

TO FIG. 1C

CONT. FROM FIG. 1B

Night scene   Photo   Video   Panorama   More

106

CONT. FROM FIG. 2A

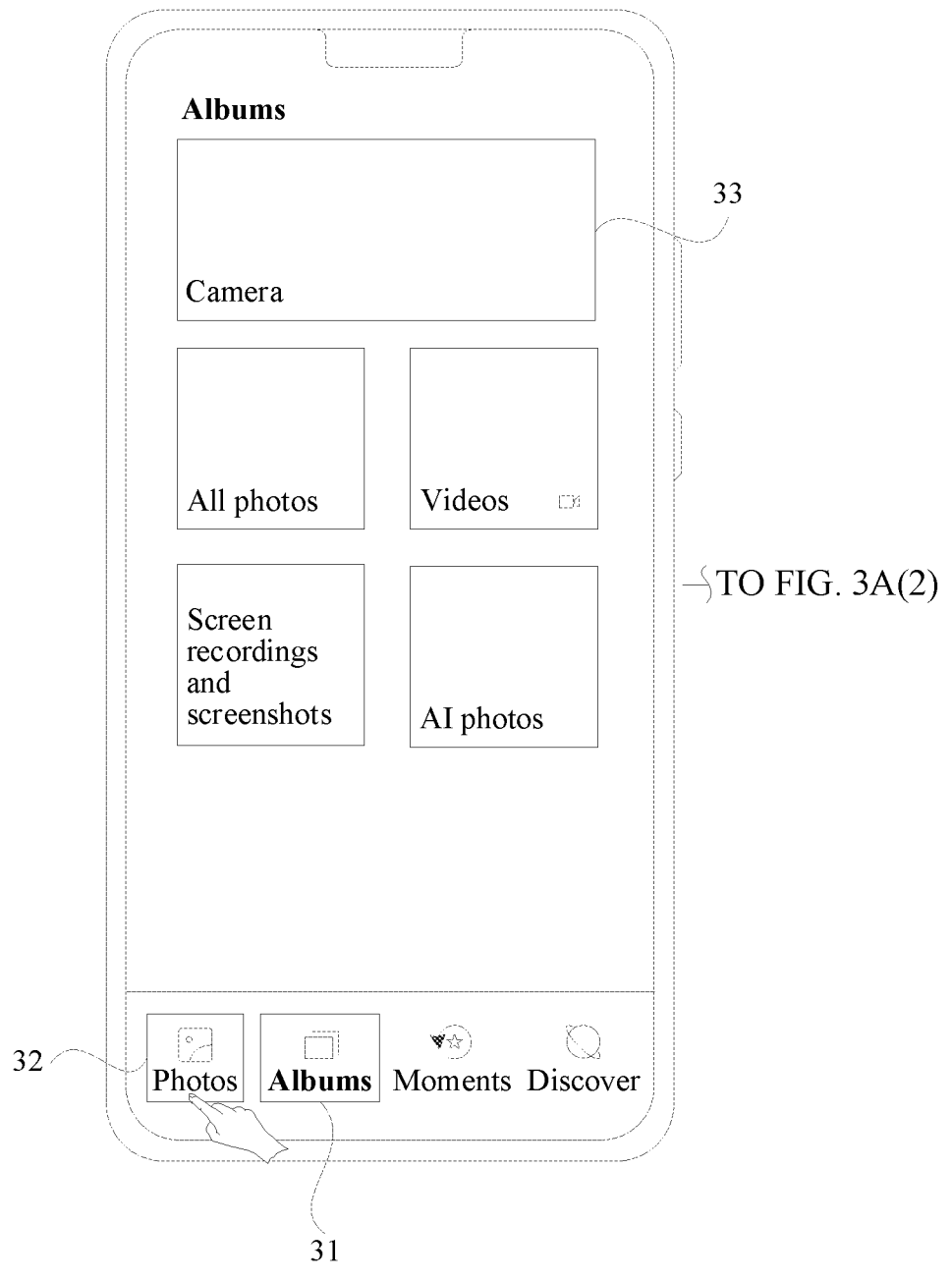
TO FIG. 3A(2)
FIG. 3A(1)

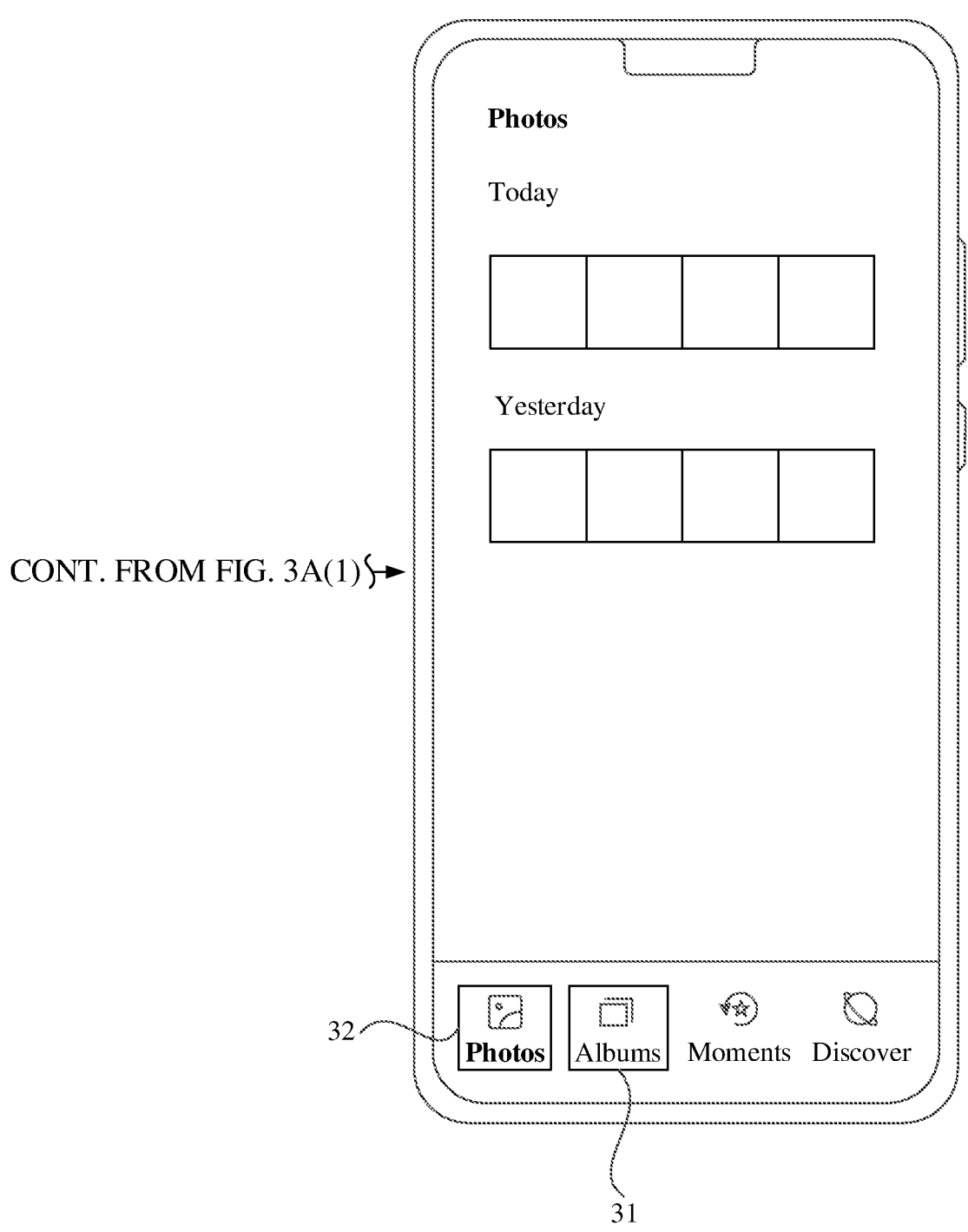
CONT. FROM FIG. 3A(1)
FIG. 3A(2)

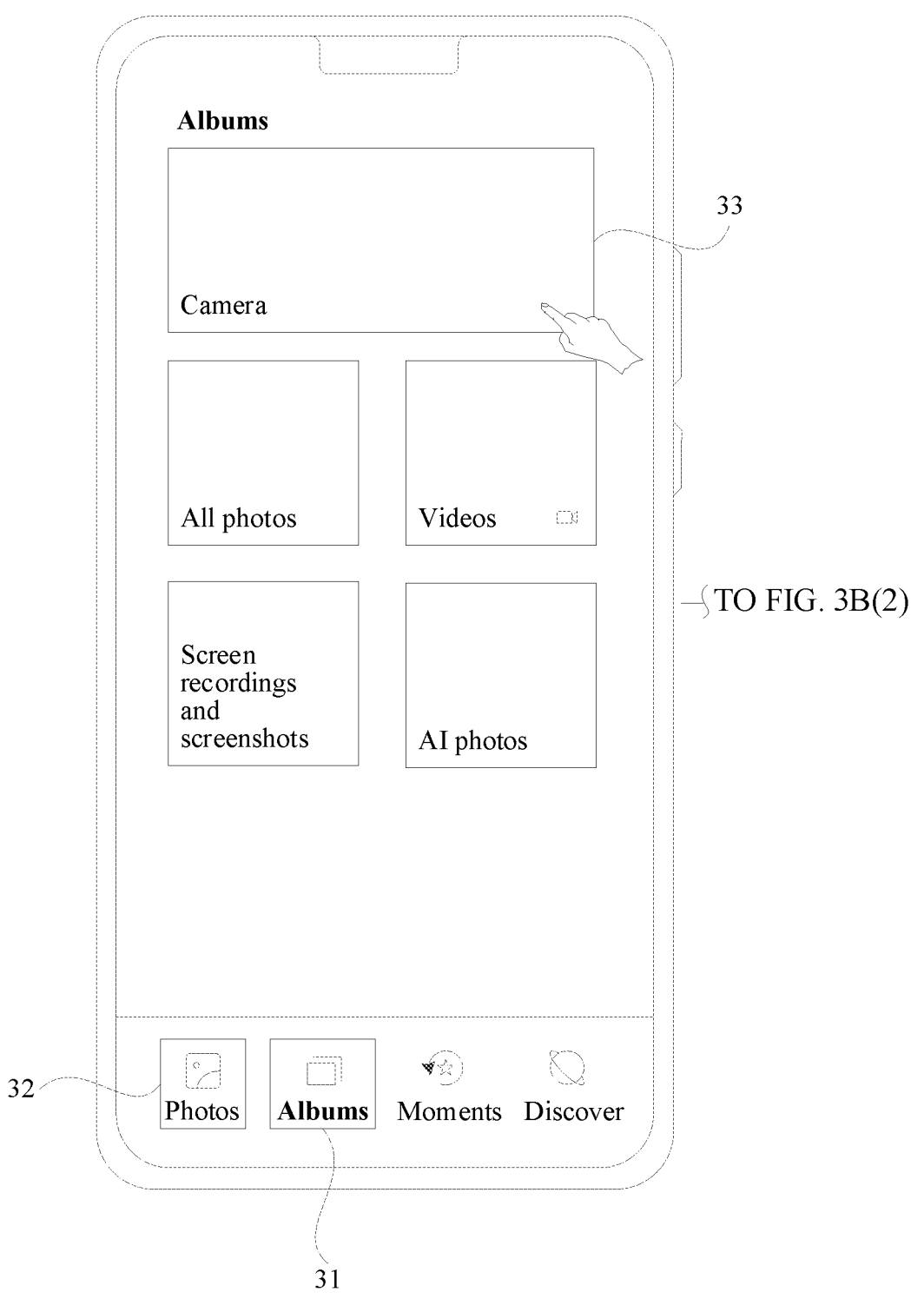
FIG. 3B(1)

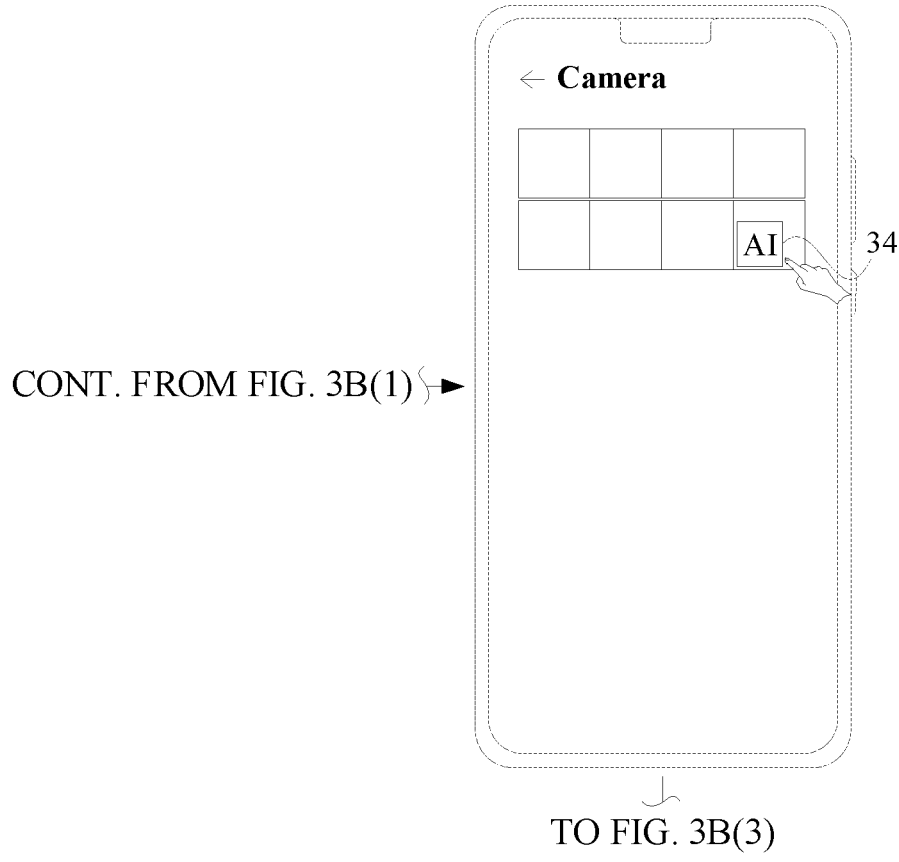
CONT. FROM FIG. 3B(1)
TO FIG. 3B(3)
FIG. 3B(2)

CONT. FROM FIG. 3B(2)
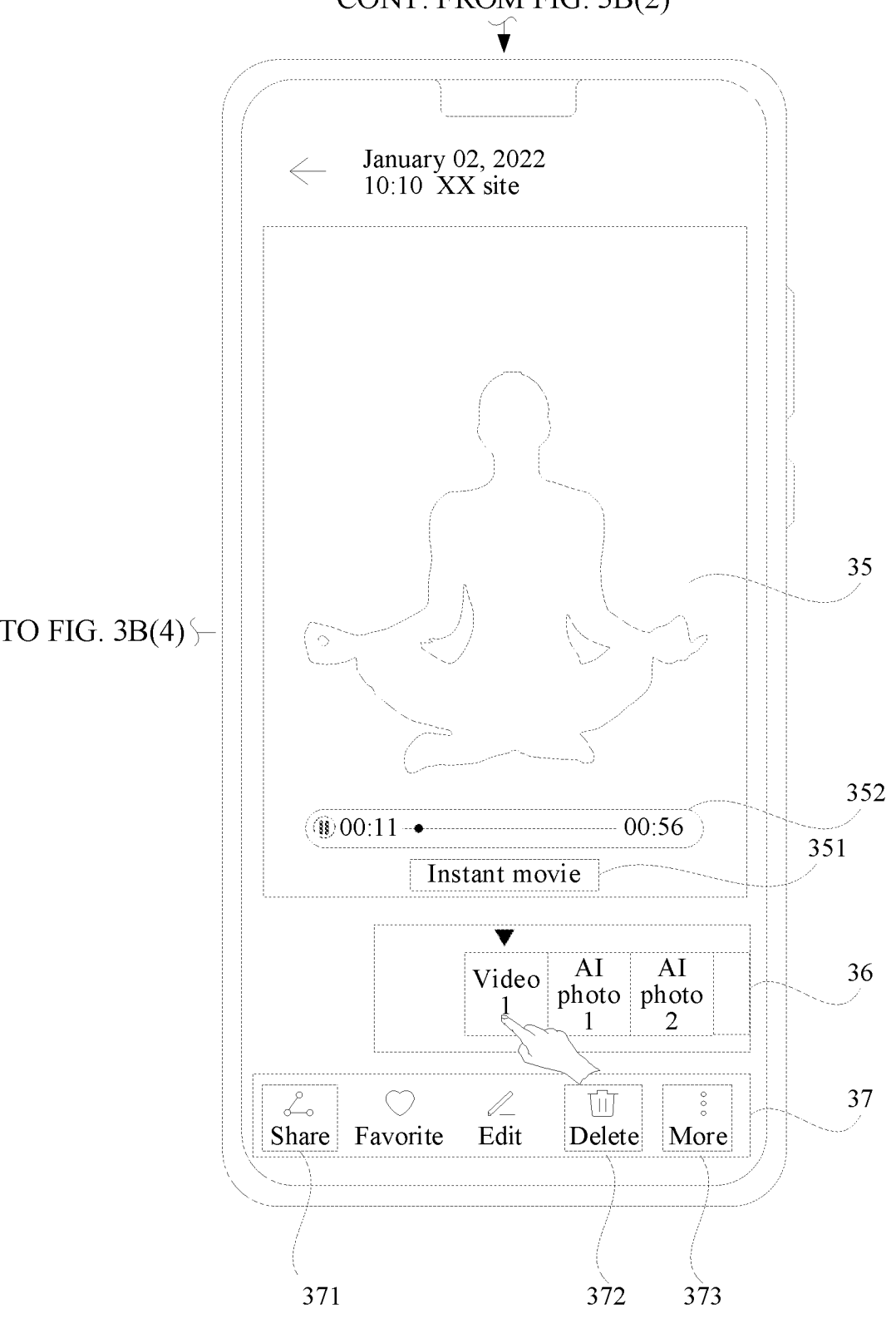
FIG. 3B(3)

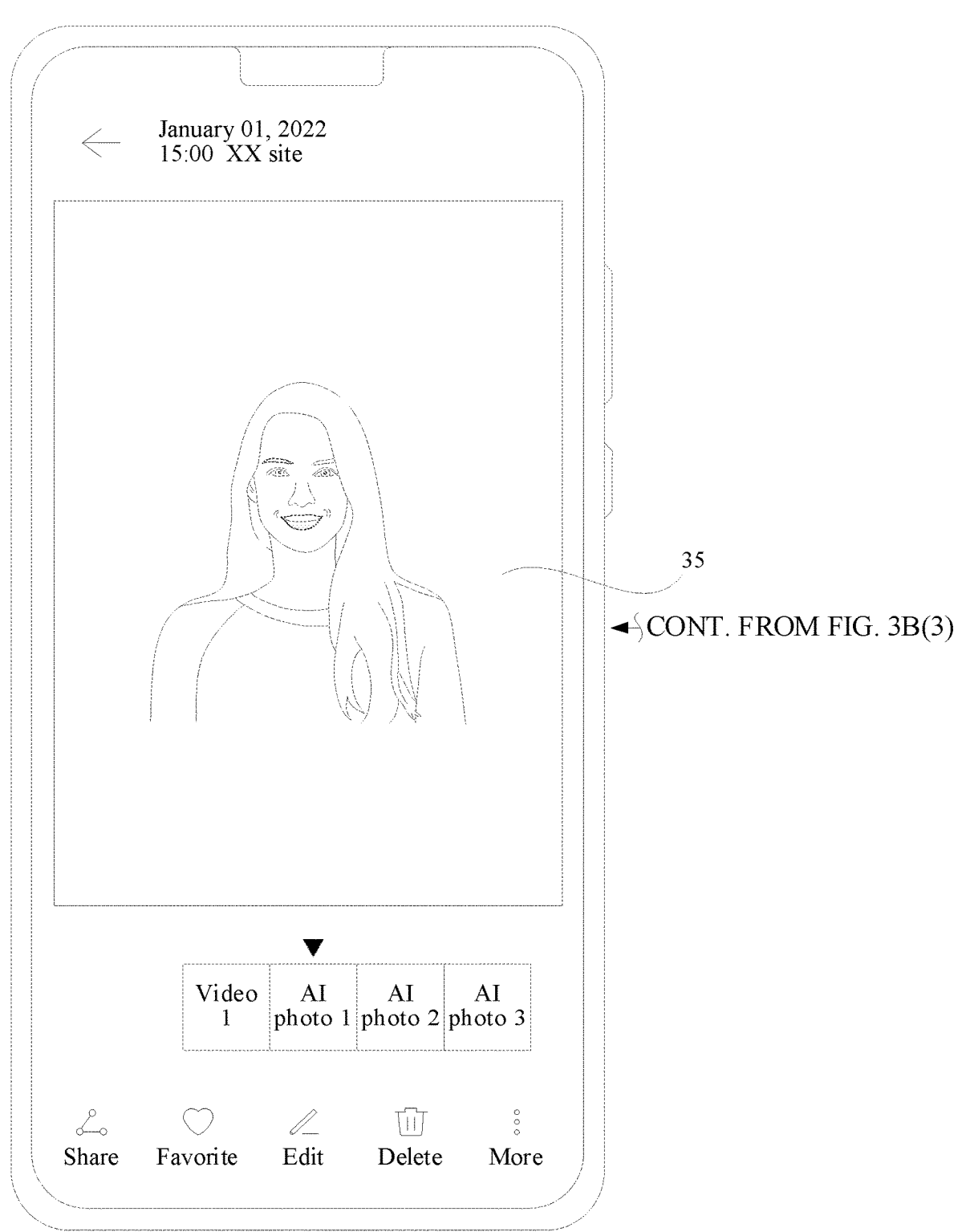
35
◄ CONT. FROM FIG. 3B(3)
FIG. 3B(4)

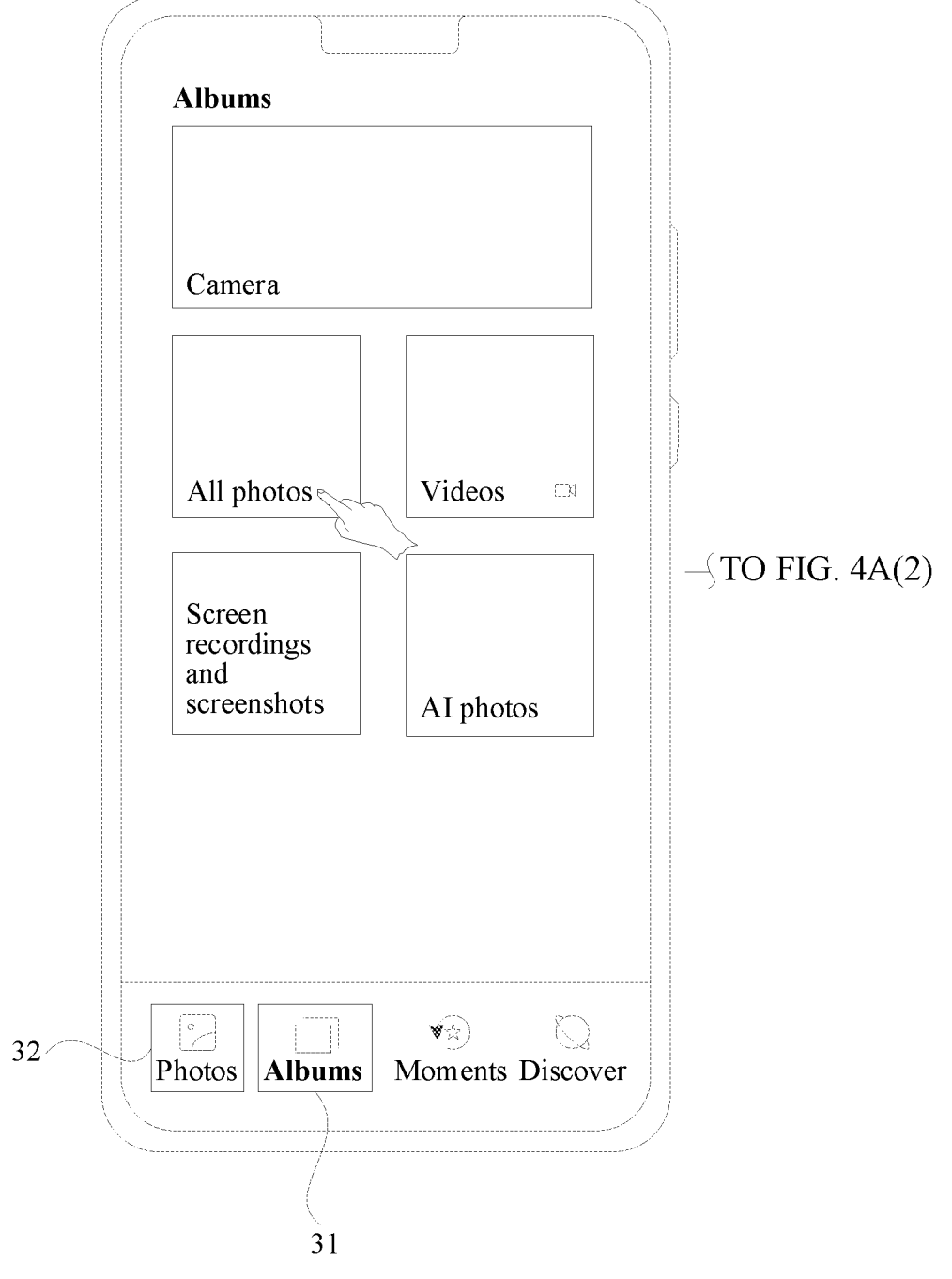
TO FIG. 4A(2)
FIG. 4A(1)

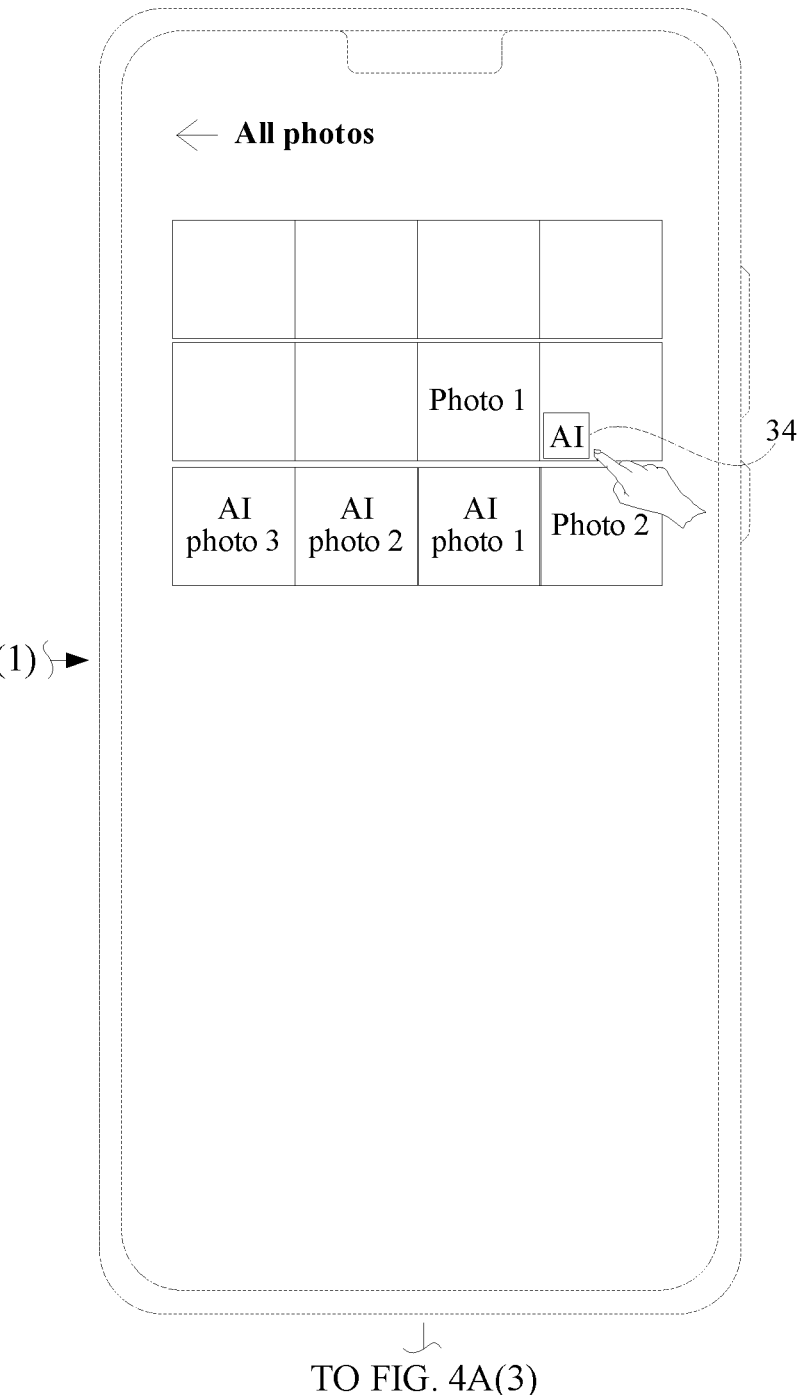
CONT. FROM FIG. 4A(1)
TO FIG. 4A(3)
FIG. 4A(2)

CONT. FROM FIG. 4A(2)

January 02, 2022
10:10 XX site

Instant movie

| Video 1 | AI photo 1 | AI photo 2 |

36

| Share | Favorite | Edit | Delete | More |

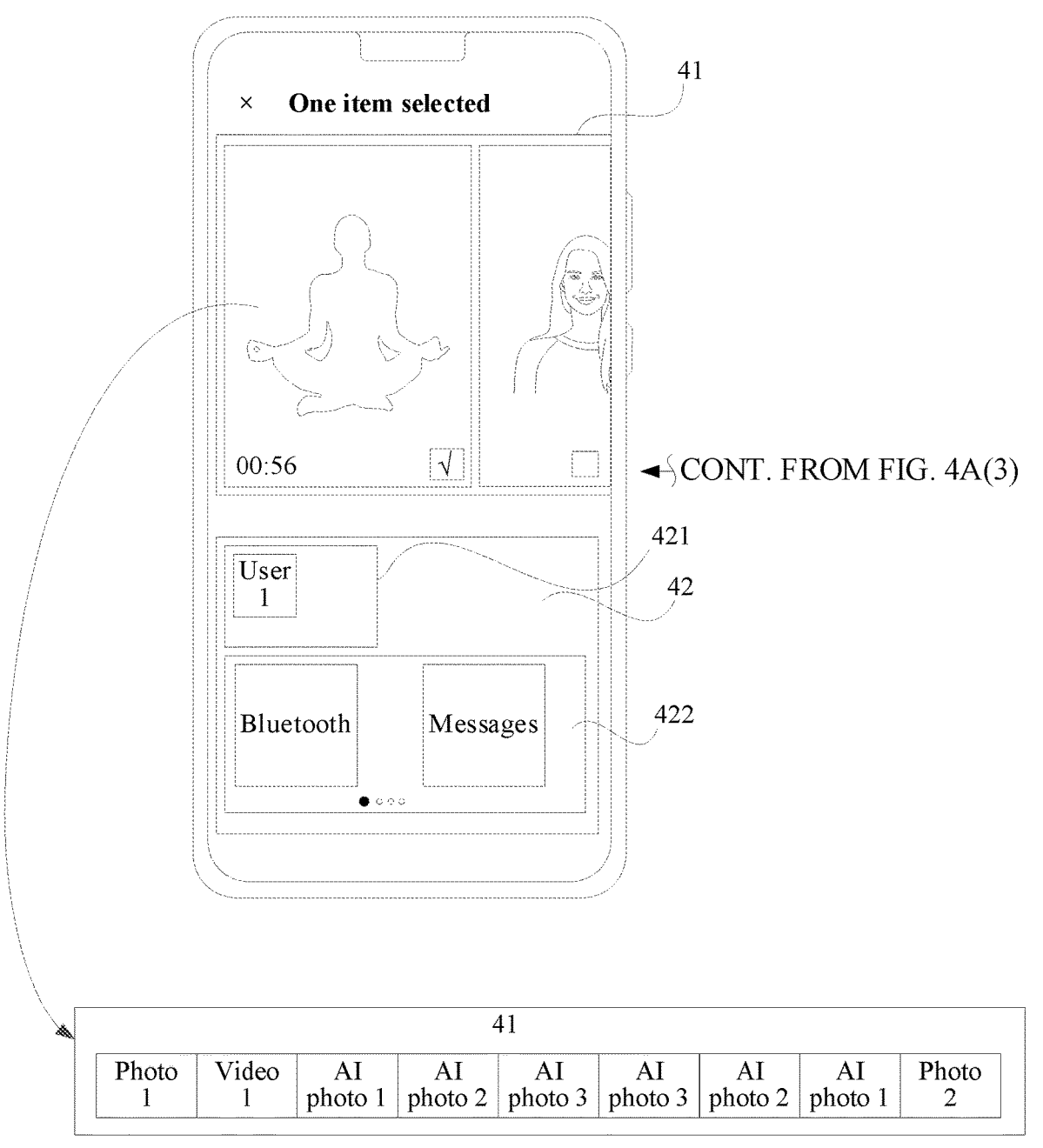
FIG. 4A(4)

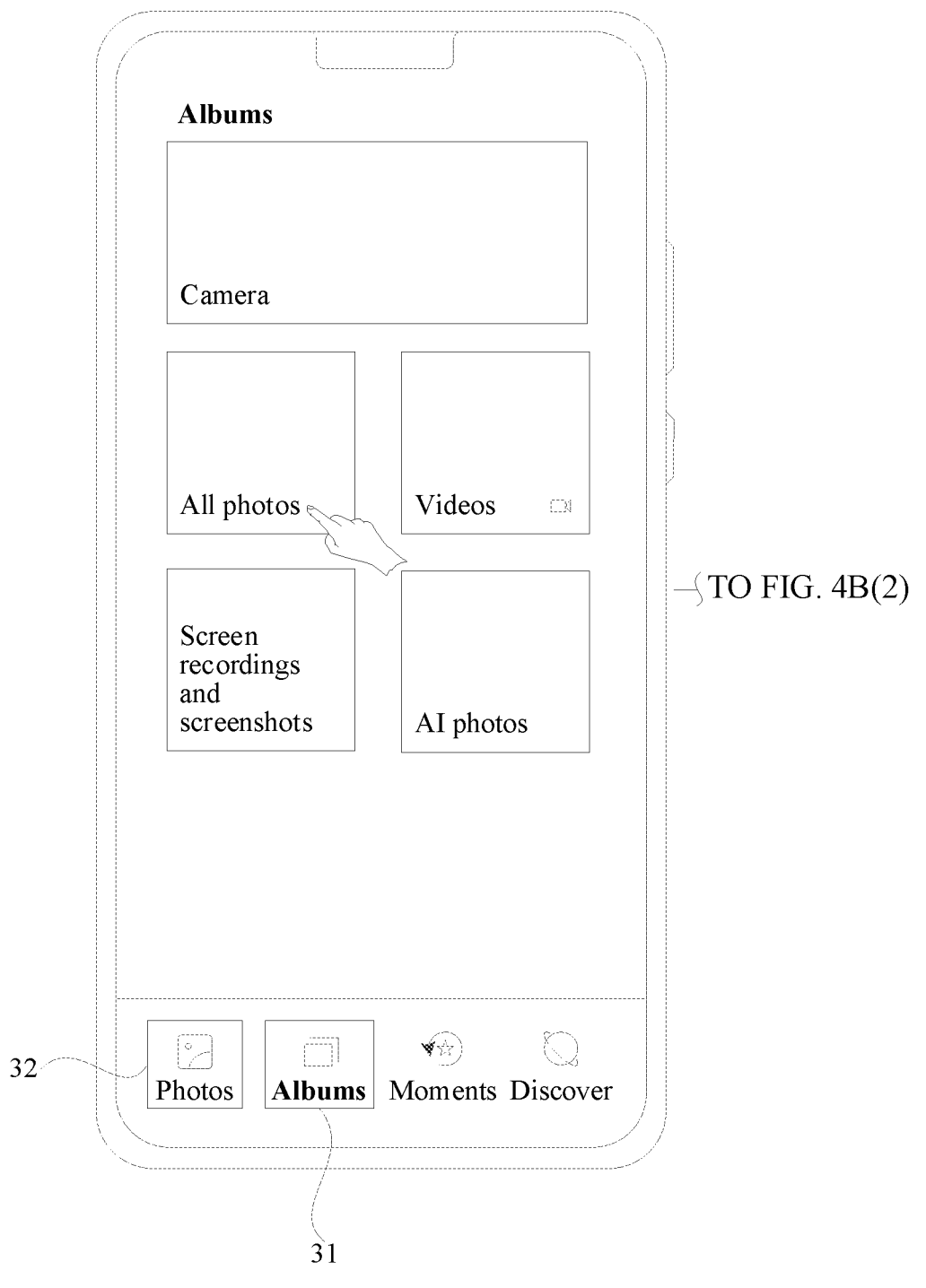
TO FIG. 4B(2)
FIG. 4B(1)

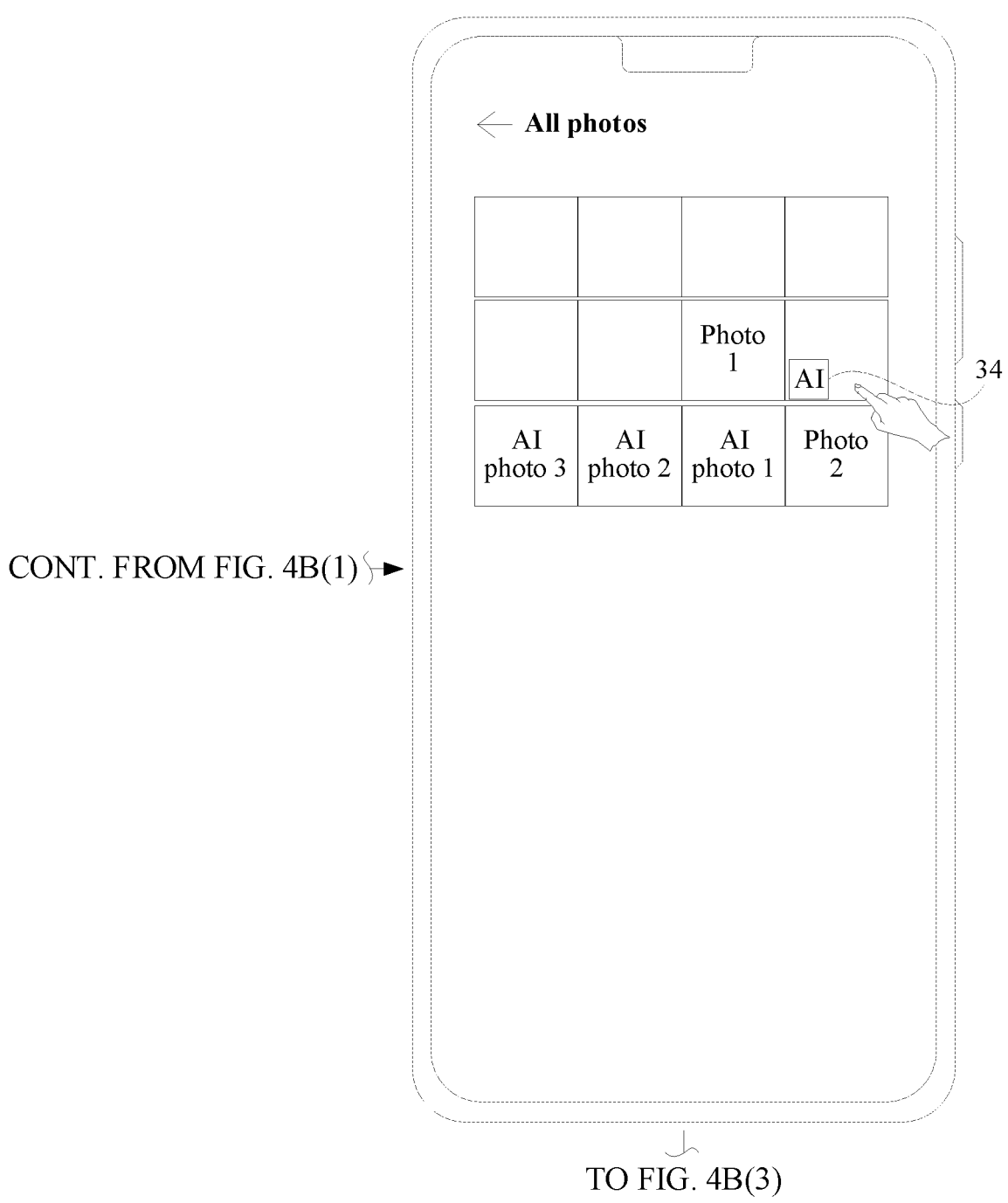
CONT. FROM FIG. 4B(1)
TO FIG. 4B(3)
FIG. 4B(2)

CONT. FROM FIG. 4B(2)
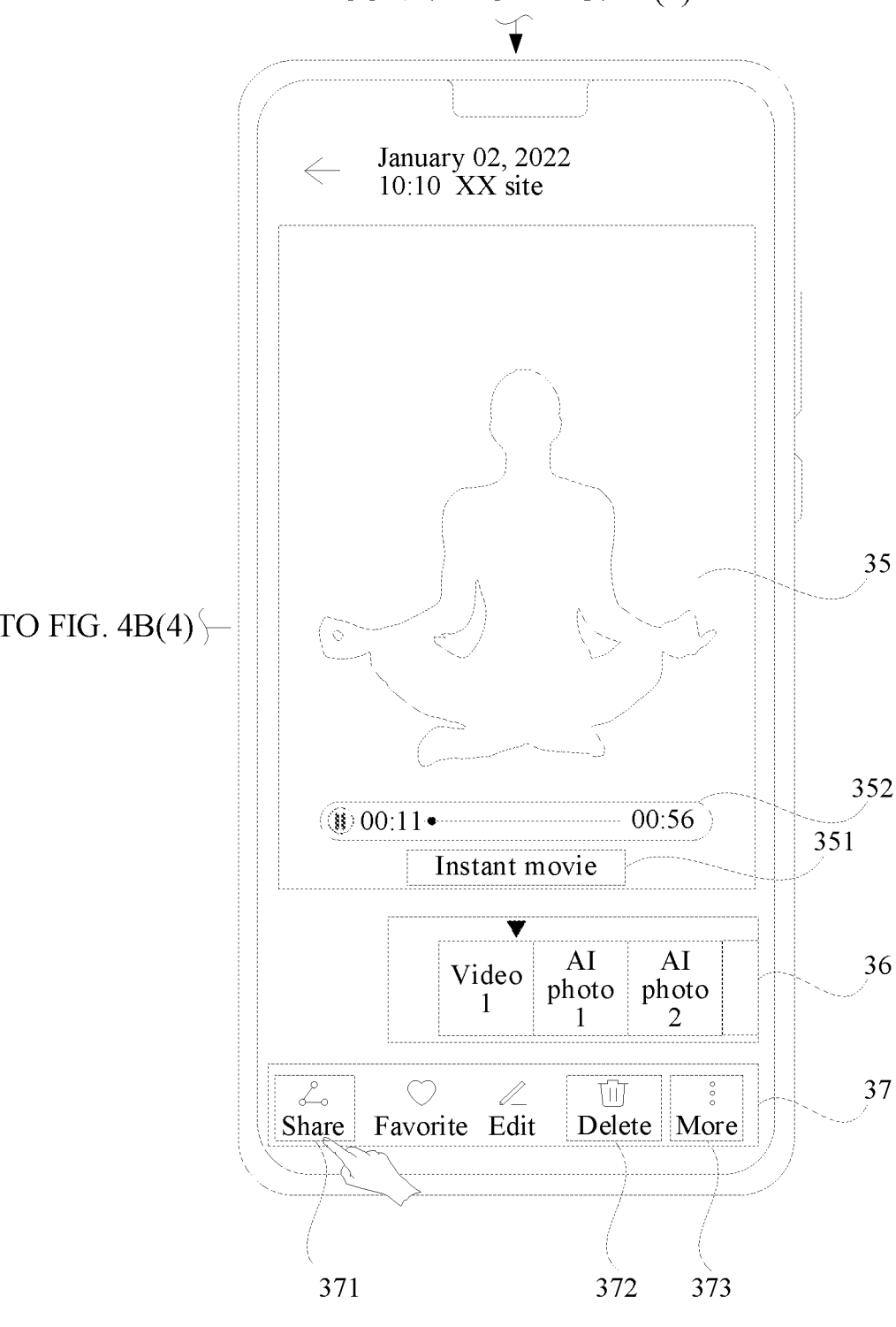
FIG. 4B(3)

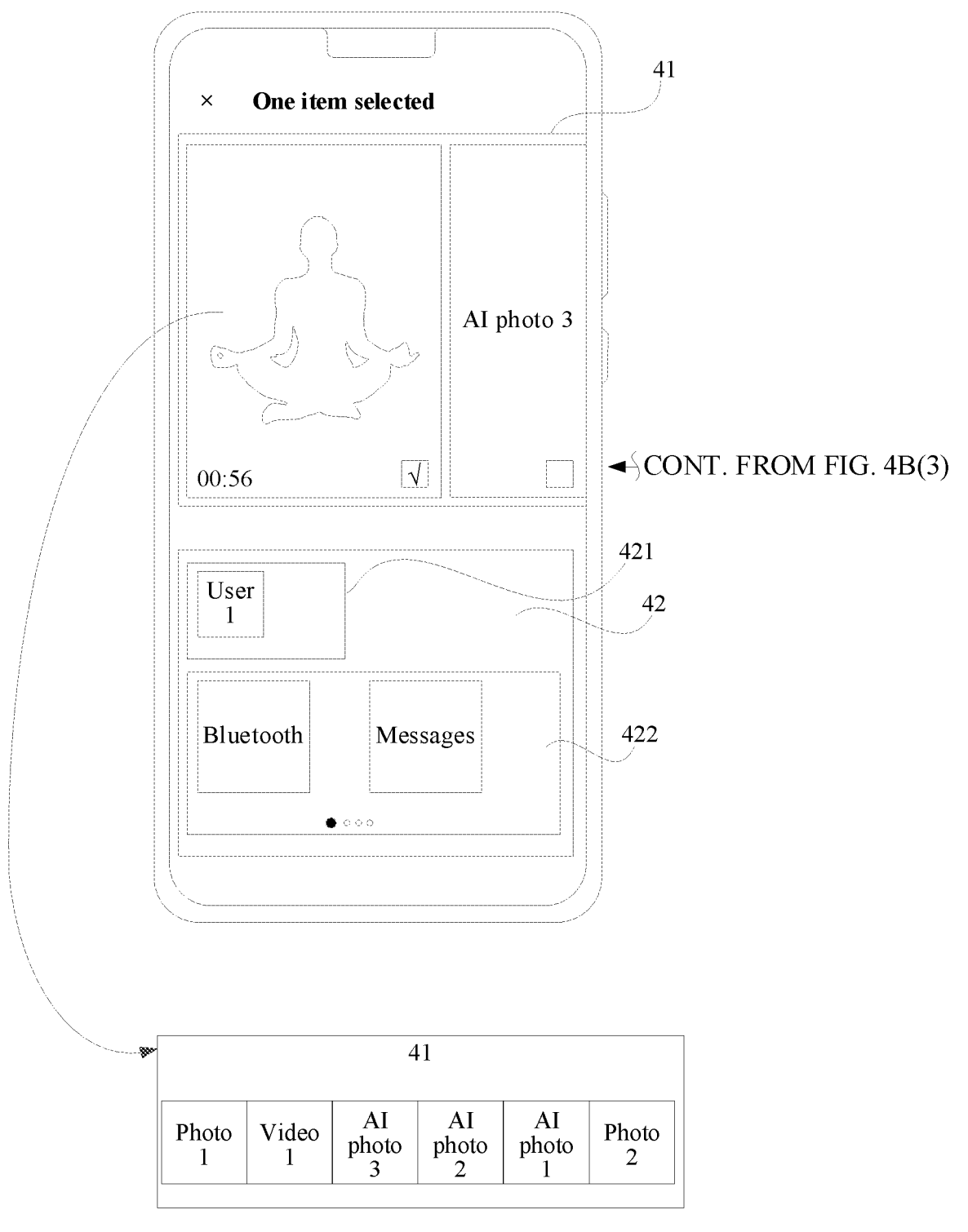
FIG. 4B(4)

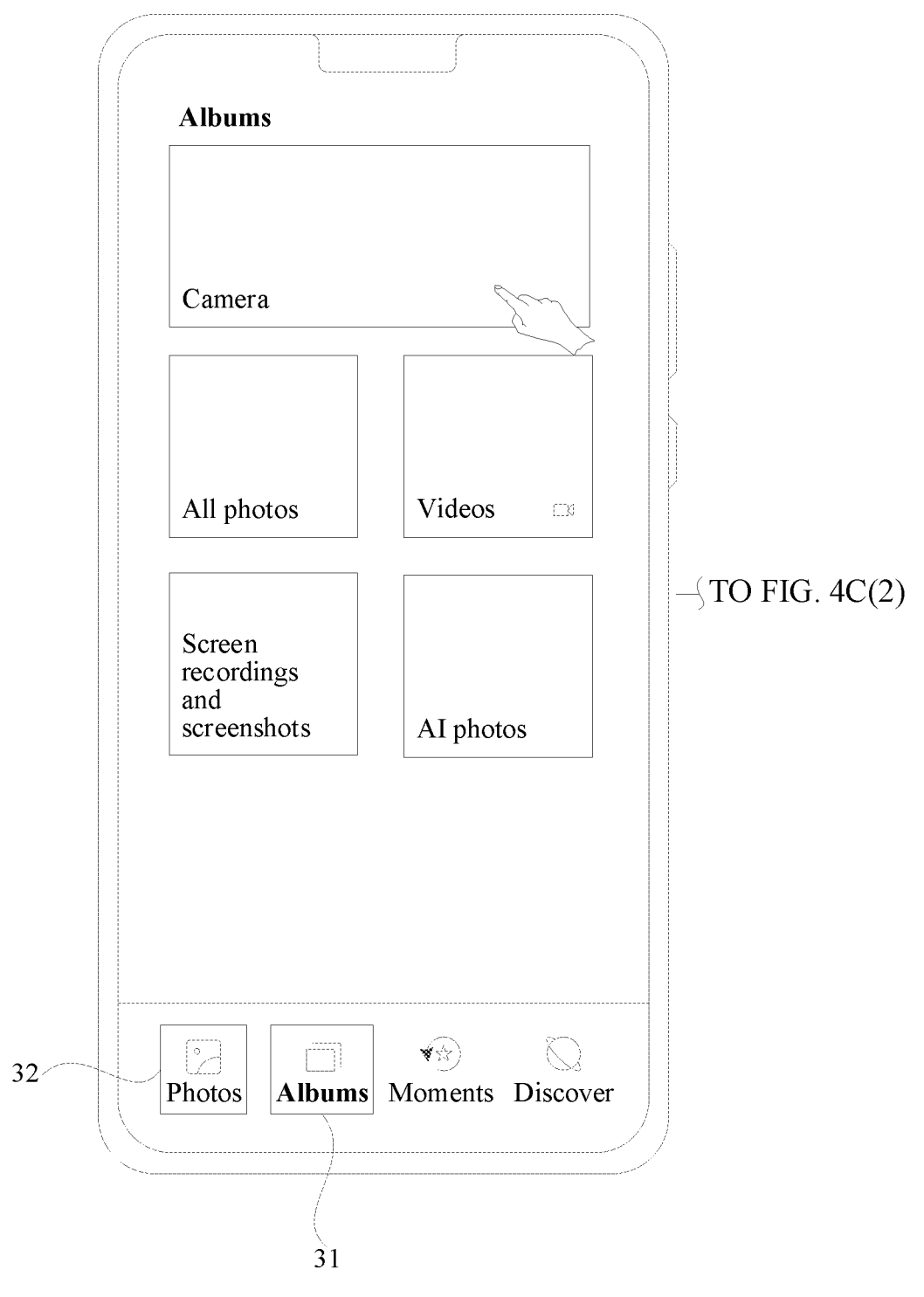
TO FIG. 4C(2)
FIG. 4C(1)

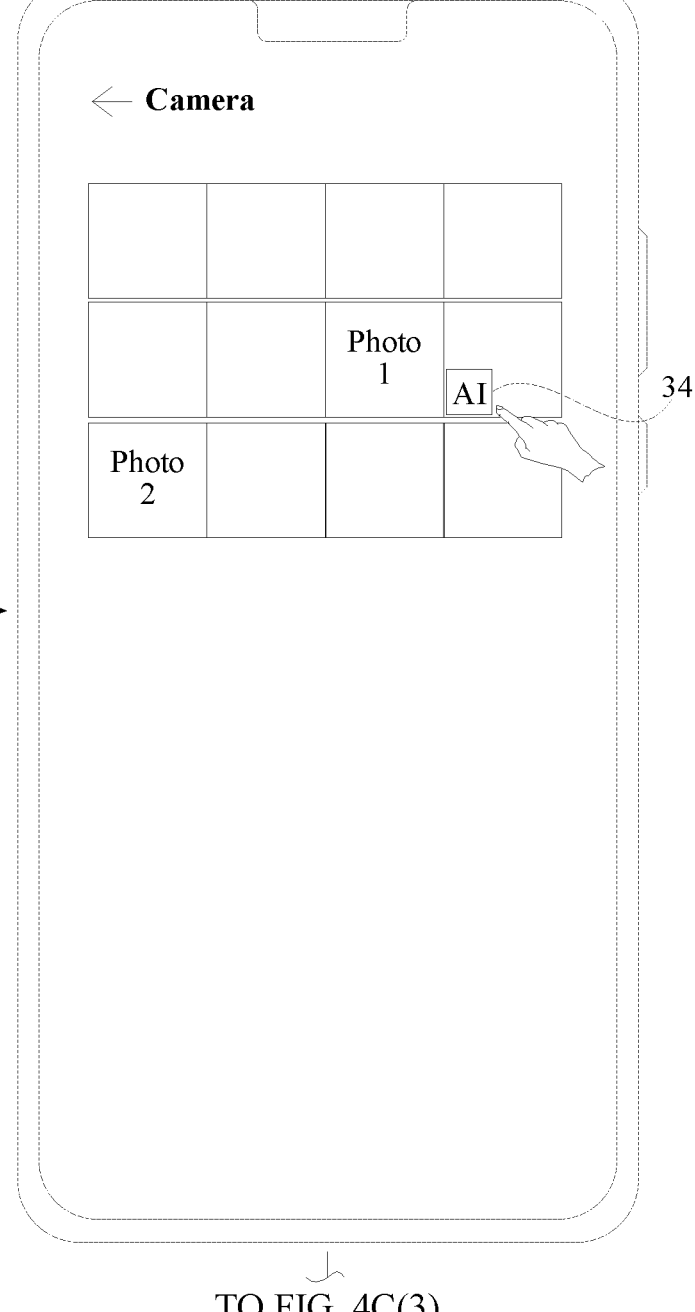
CONT. FROM FIG. 4C(1)
TO FIG. 4C(3)
FIG. 4C(2)

CONT. FROM FIG. 4C(2)
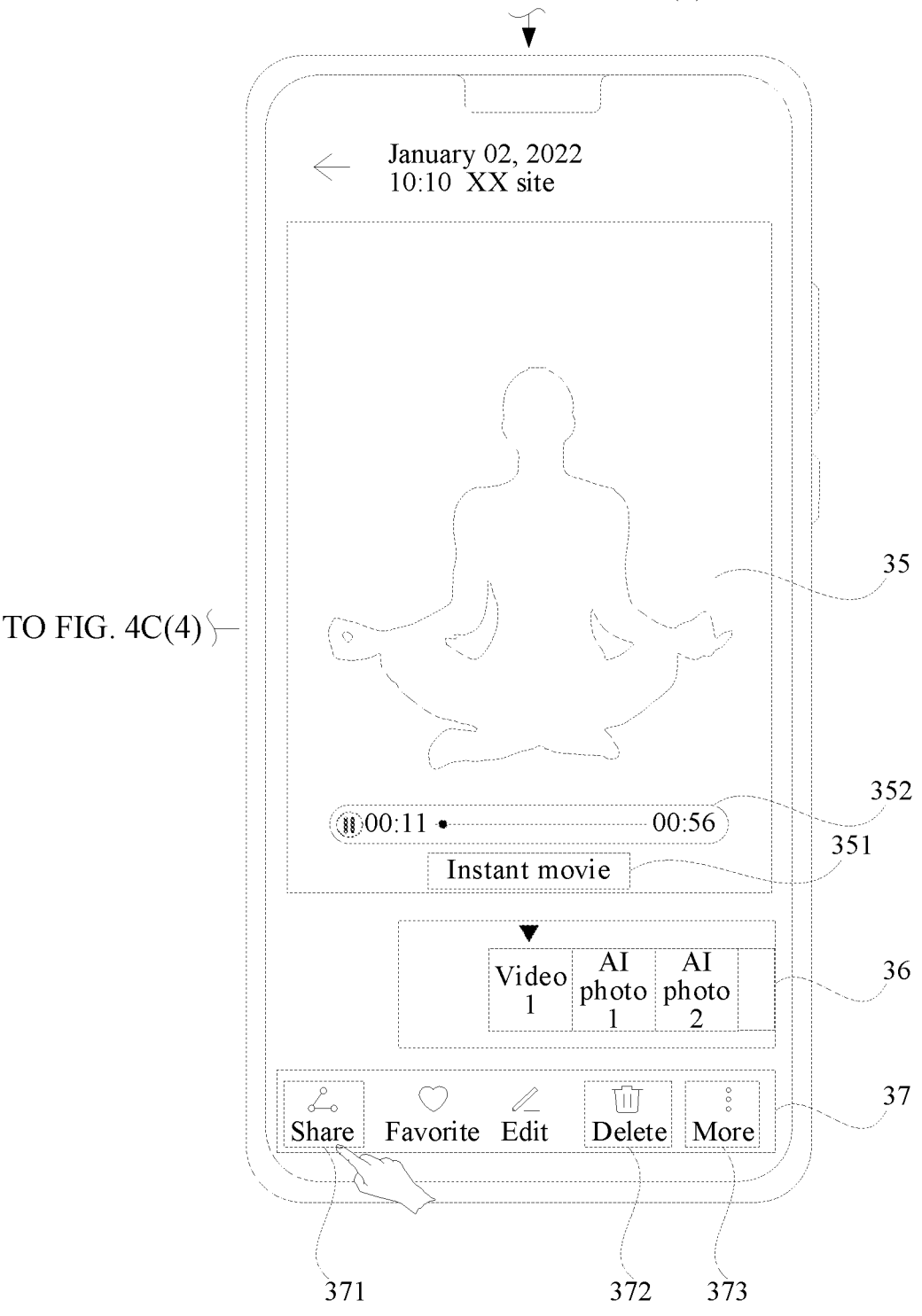
FIG. 4C(3)

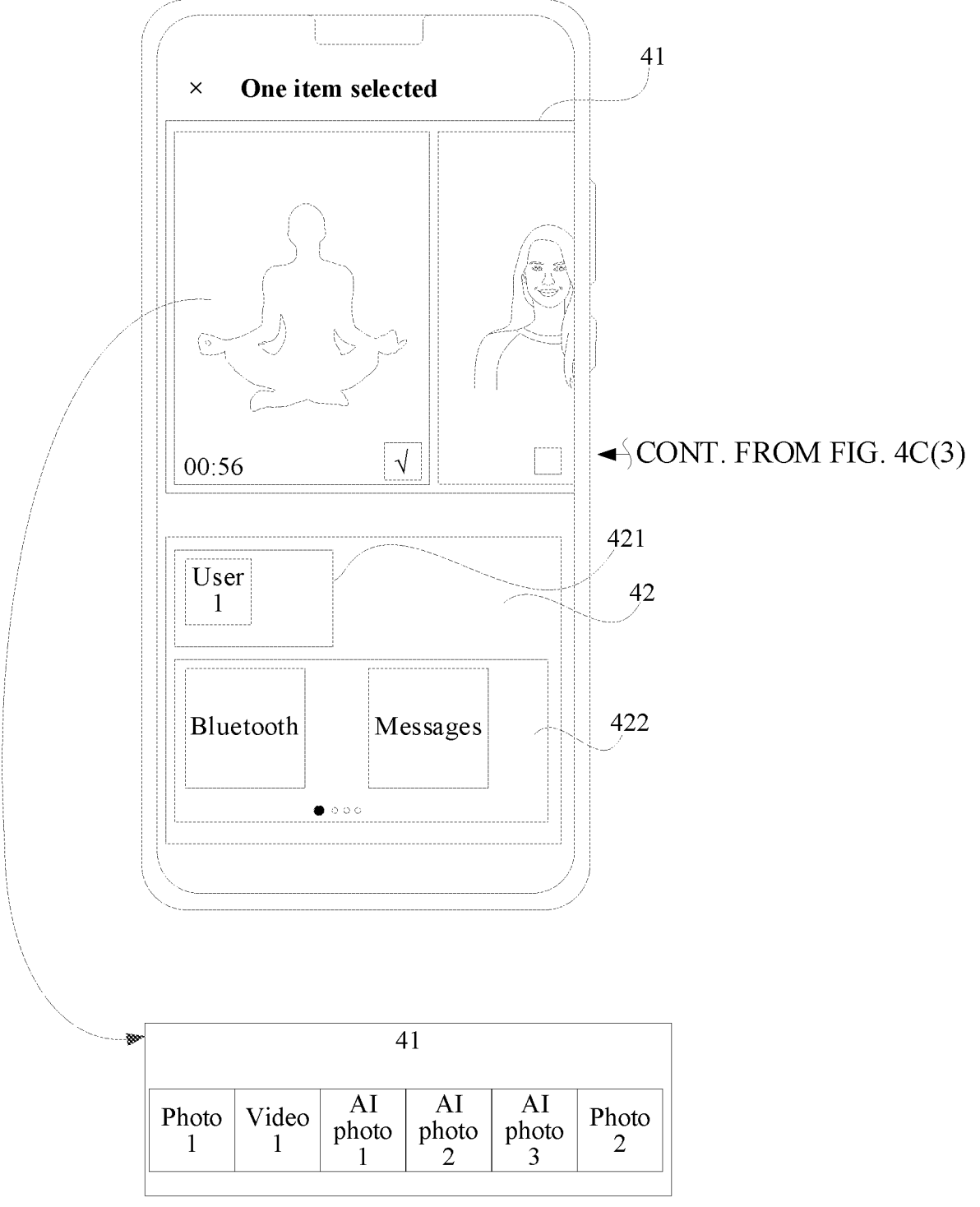
FIG. 4C(4)

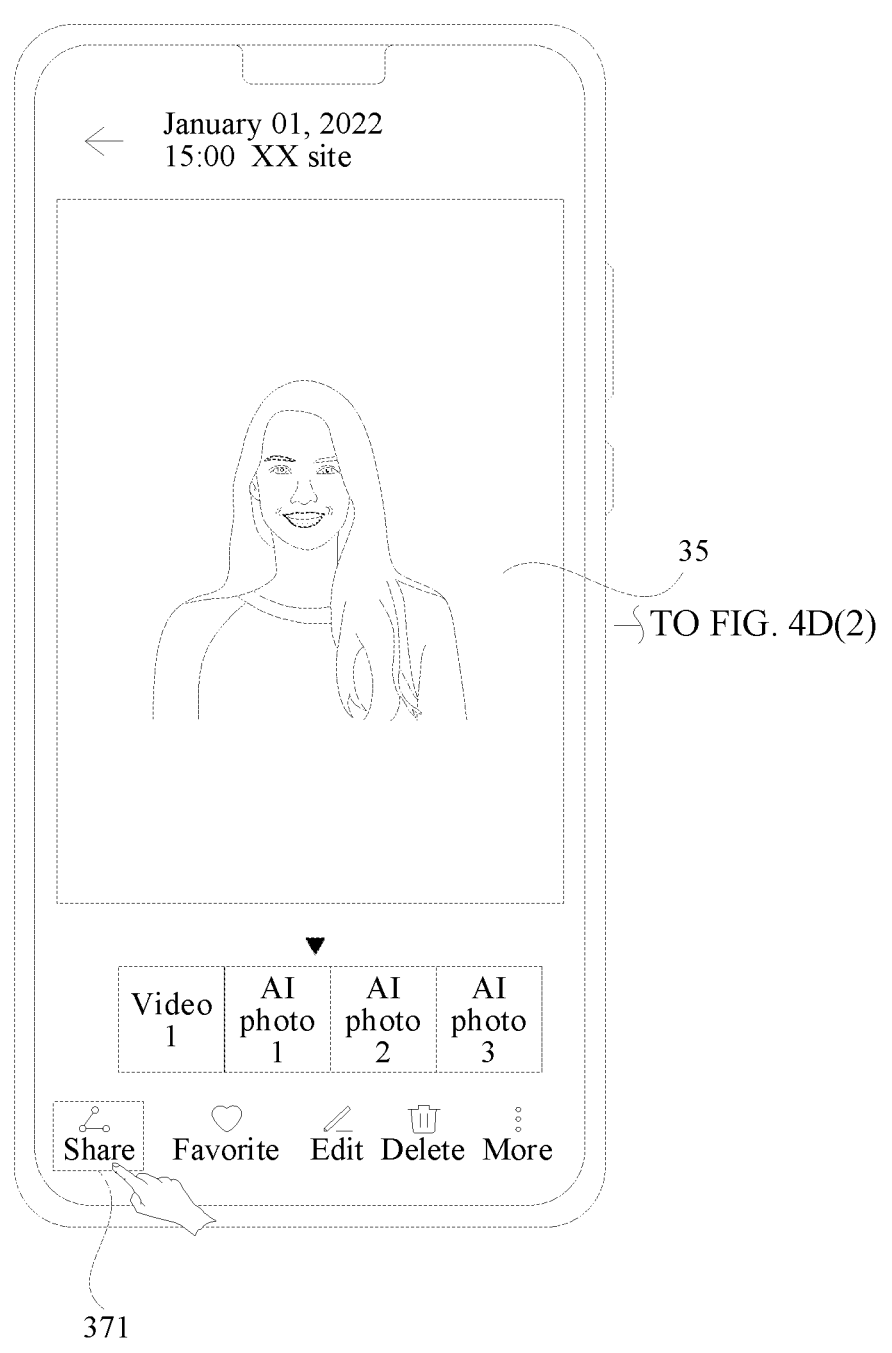
35
TO FIG. 4D(2)
371
FIG. 4D(1)

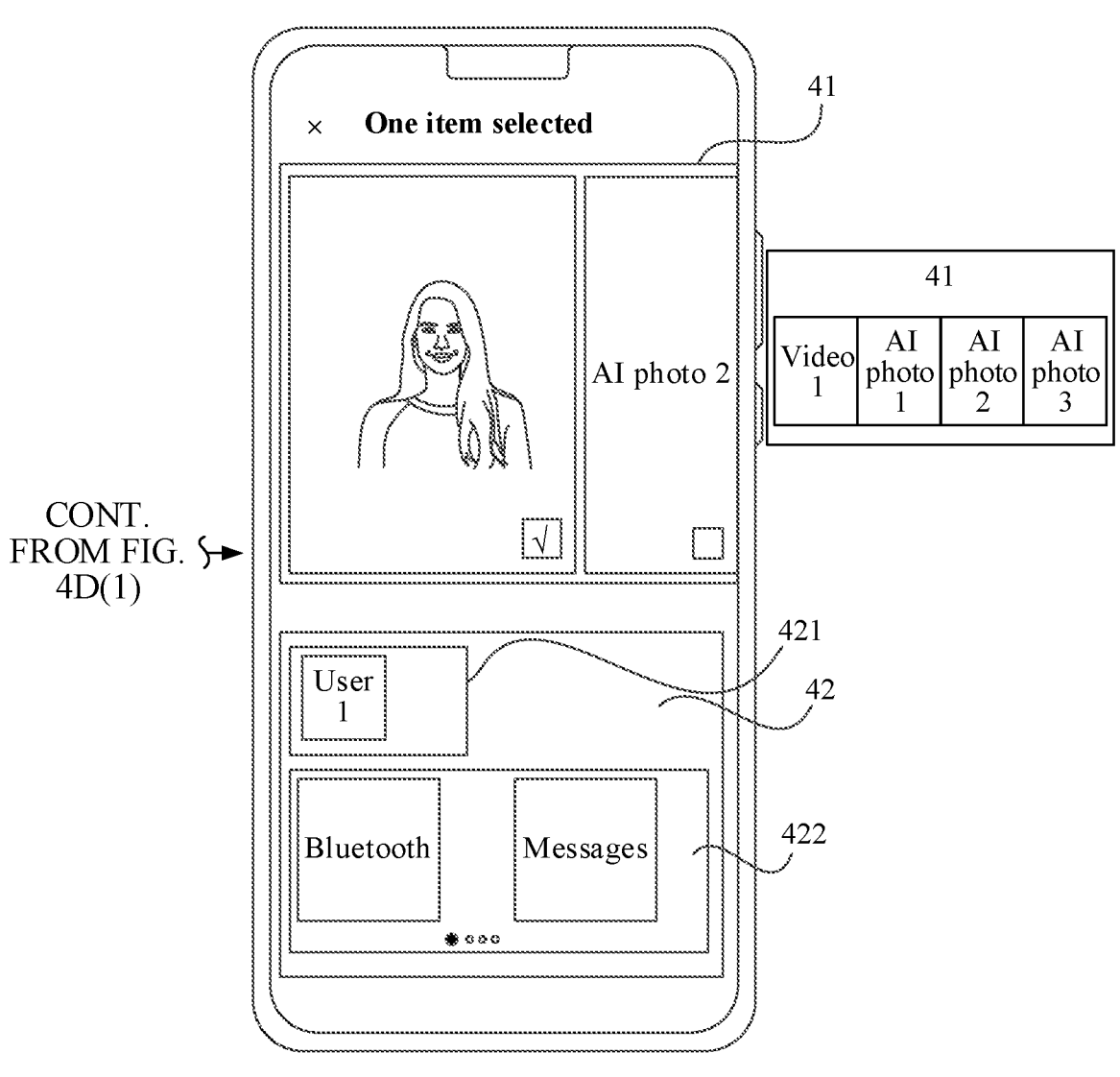
FIG. 4D(2)

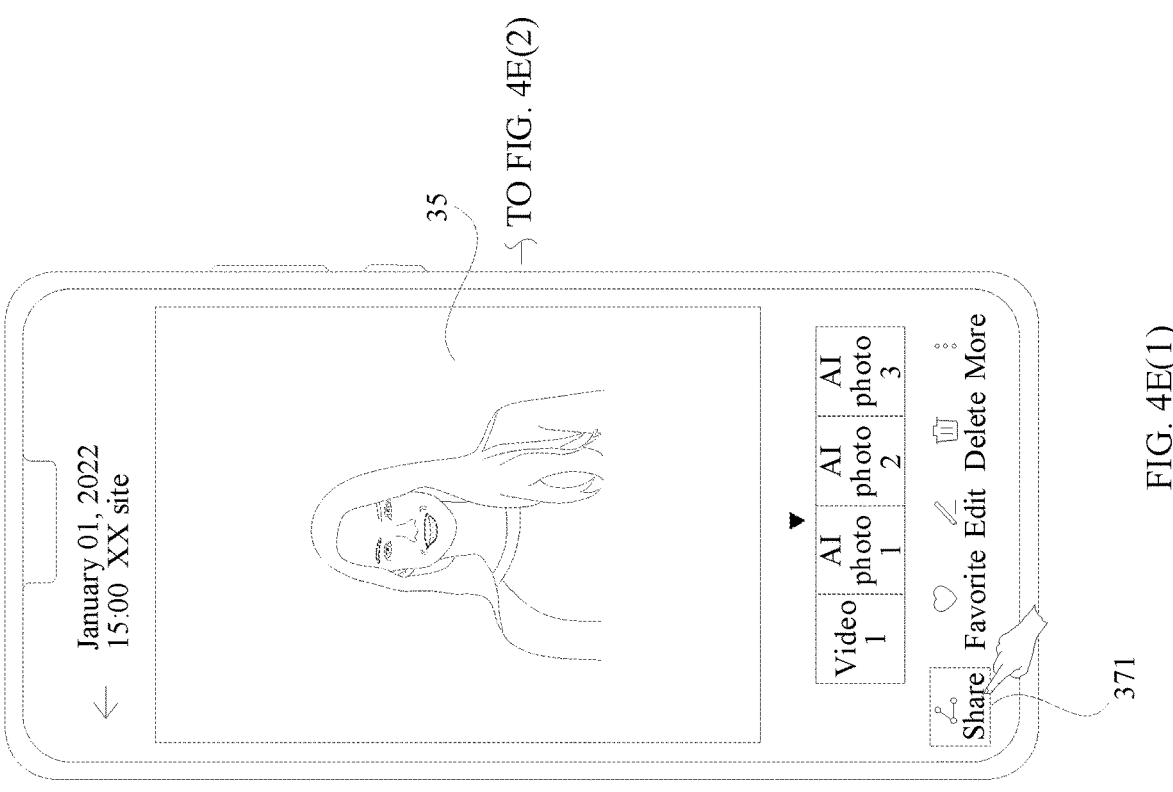
TO FIG. 4E(2)
FIG. 4E(1)

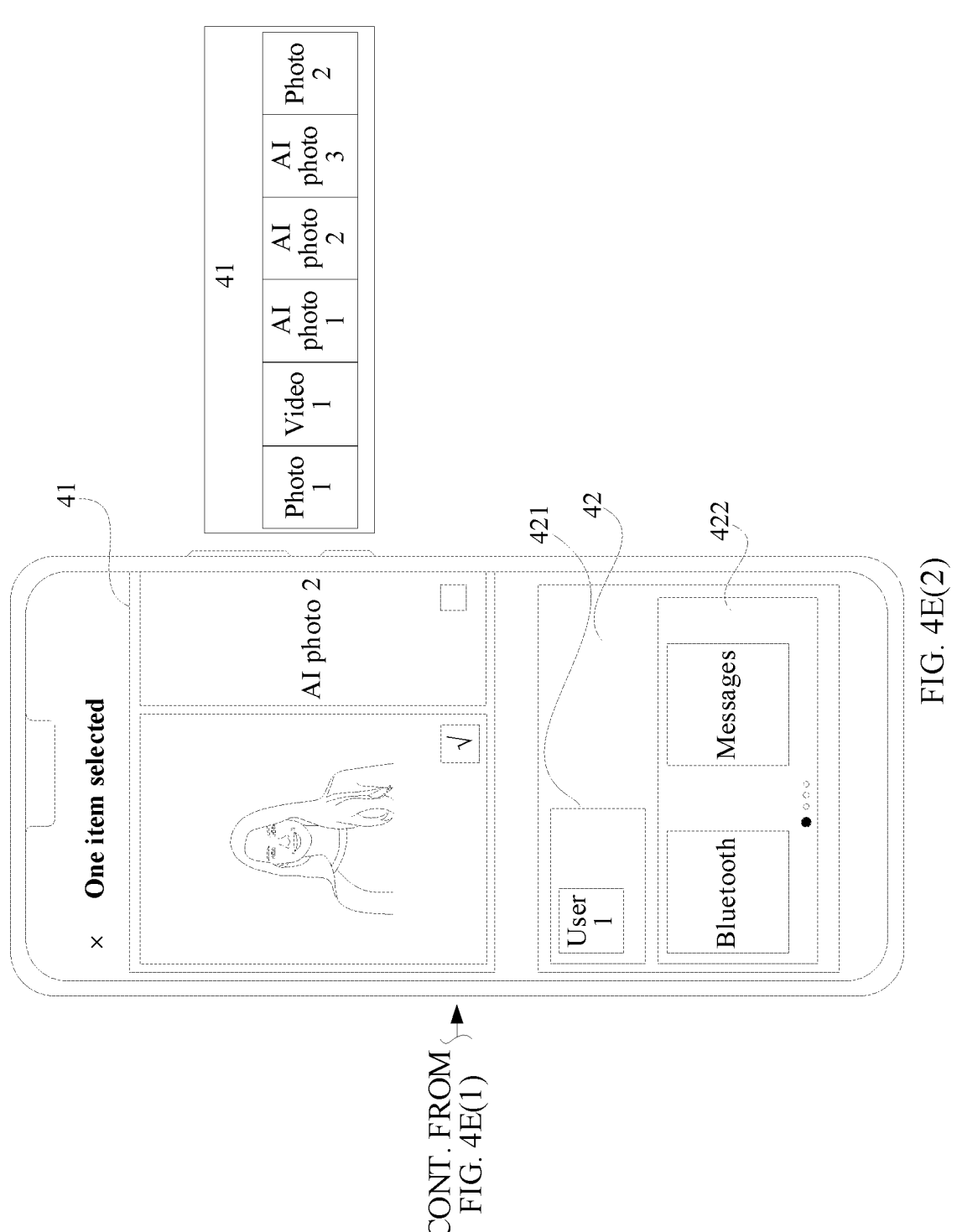
FIG. 4E(2)

Touch
and hold

TO FIG. 5B

CONT. FROM FIG. 5A

TO FIG. 5C

CONT. FROM FIG. 5B

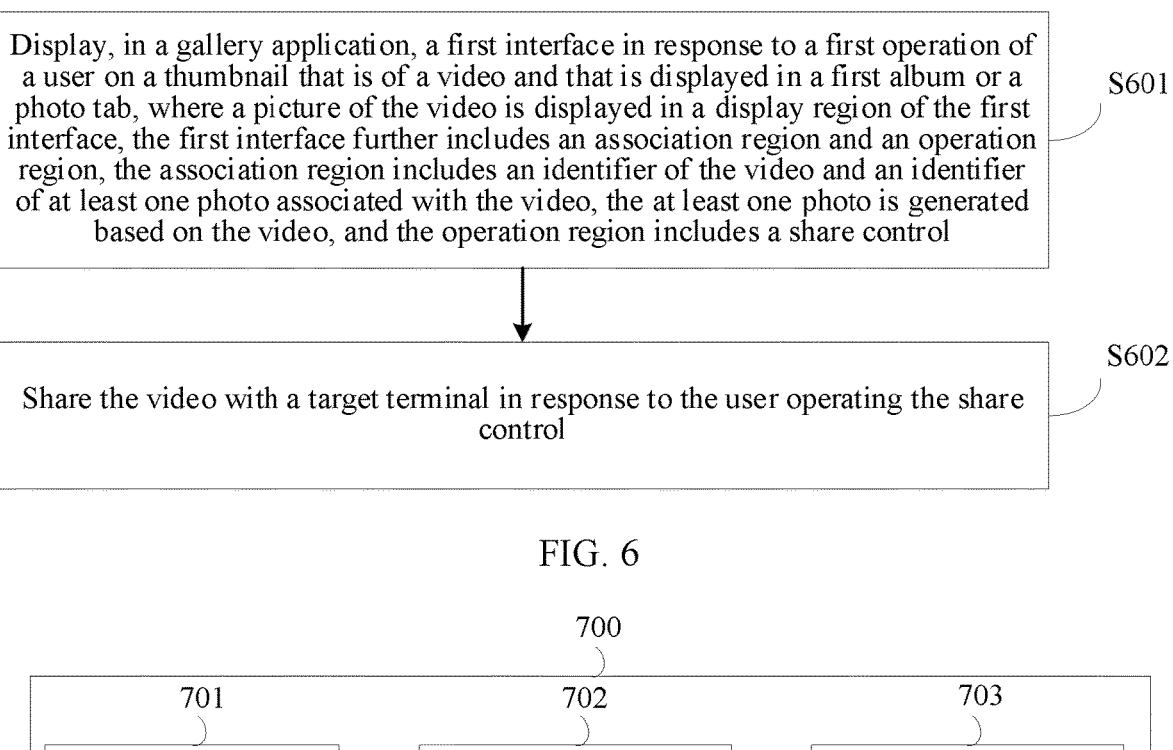

Display, in a gallery application, a first interface in response to a first operation of a user on a thumbnail that is of a video and that is displayed in a first album or a photo tab, where a picture of the video is displayed in a display region of the first interface, the first interface further includes an association region and an operation region, the association region includes an identifier of the video and an identifier of at least one photo associated with the video, the at least one photo is generated based on the video, and the operation region includes a share control     S601

Share the video with a target terminal in response to the user operating the share control     S602

| Display module | Transceiver module | Processing module |

FIG. 7

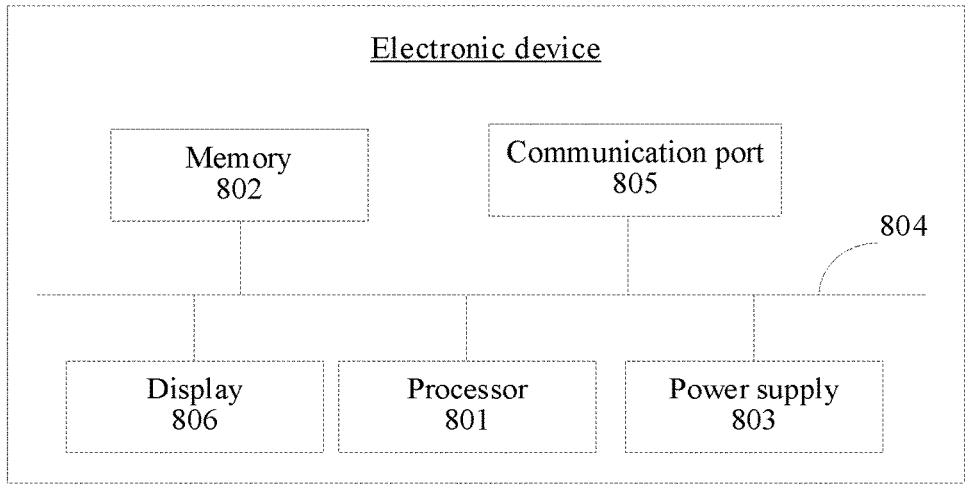

Electronic device

Memory 802

Communication port 805

804

Display 806

Processor 801

Power supply 803

FIG. 8

HUMAN-MACHINE INTERACTION METHOD AND APPARATUS, AND ELECTRONIC DEVICE

CROSS-REFERENCE TO RELATED APPLICATIONS

This application is a National Stage application of International Application No. PCT/CN2023/070780, filed Jan. 5, 2023, which application claims priority to Chinese Patent Application No. 202210193754.8, filed on Feb. 28, 2022, which are incorporated herein by reference in their entirety.

TECHNICAL FIELD

Embodiments of this application relate to the field of human-machine interaction technologies, and in particular, to a human-machine interaction method and apparatus, and an electronic device.

BACKGROUND

Users can record their lives by taking photos or recording videos. Compared with photos, videos can record more wonderful instants, but photos sometimes have difficulty in capturing wonderful instants. Therefore, when the users use videos to record their lives, rich content can be recorded in the videos.

In some shooting scenarios, the users expect to be able to capture photos from a captured original video. A current manner for further processing the original video and the photos need to be improved.

SUMMARY

Embodiments of this application provide a human-machine interaction method and apparatus, and an electronic device, which can achieve sharing an original video in a scenario in which photos are extracted from the original video.

According to a first aspect, an embodiment of this application provides a human-machine interaction method. An execution entity that performs the human-machine interaction method may be a terminal or a chip in a terminal. The following uses a terminal as an example for description.

In the method, in a scenario in which an associated photo is generated based on an original video, sharing the video can be achieved. A first interface is displayed in a gallery application in response to a first operation of a user on a thumbnail that is of a video and that is displayed in a first album or a photo tab. A picture of the video is displayed in a display region of the first interface. The first interface further includes an association region and an operation region. The association region includes an identifier of the video and an identifier of at least one photo associated with the video. The at least one photo is generated based on the video. The operation region includes a share control. In this embodiment of this application, when the user opens and displays a video in the first album or the photo tab, a photo associated with the video and the share control may be displayed on a display interface of the video. The user may operate the share control to share the video. Correspondingly, the video is shared with a target terminal in response to the user operating the share control.

It should be understood that the target terminal may be a preset terminal, or a terminal selected by the user to share the video. In an embodiment, the first album is an album including the video. For example, the first album is a camera album, or the first album may be any one of the following: a camera album, an all photos album, a videos album, my favorites, a smart album, a map album, search results, and the like.

In an embodiment, the photo tab includes the video.

The thumbnail that is of the video and that is displayed in the first album and the thumbnail that is of the video and that is displayed in the photo tab include an identifier indicating that a photo is associated with the video. The identifier of the video is a thumbnail of a first frame (picture) of the video, and an identifier of each photo associated with the video is a thumbnail of each photo.

In a possible implementation, the terminal displays a first sharing interface in response to the user operating the share control. The first sharing interface includes a first to-be-shared content browsing region and a sharing selection region. The sharing selection region includes an identifier of a to-be-shared user. Correspondingly, the video is shared with the target terminal in response to an operation of the user on an identifier of a target user in the identifier of the to-be-shared user. The target terminal is a terminal corresponding to the target user.

In this embodiment of this application, content included in the first to-be-shared content browsing region is related to the first album and the photo tab to which the video belongs. In other words, when the user performs the first operation on the thumbnail that is of the video and that is displayed in the first album, the content included in the first to-be-shared content browsing region is related to the first album (in other words, whether the first album includes the at least one photo associated with the video). When the user performs the first operation on the thumbnail that is of the video and that is displayed in the photo tab, the content included in the first to-be-shared content browsing region is related to the photo tab (in other words, whether the photo tab includes the at least one photo associated with the video). The following uses the first album as an example to describe "the content included in the first to-be-shared content browsing region". The photo tab may refer to related descriptions of the first album.

In a possible implementation, for example, the content included in the first to-be-shared content browsing region is related to a type of the first album. For example, the type of the first album may include a physical album and a virtual album. For example, in the physical album, the first to-be-shared content browsing region includes the thumbnail of the video and the thumbnail of each photo associated with the video. In the virtual album, the first to-be-shared content browsing region includes the thumbnail of the video.

In a possible implementation, when the user performs the first operation on the thumbnail that is of the video and that is displayed in the first album and the first album includes the video and the at least one photo associated with the video, the first to-be-shared content browsing region includes the thumbnail of the video. In this implementation, a case that a photo associated with the video appears repeatedly in the first to-be-shared content browsing region can be avoided, thereby improving user experience.

In this implementation, previous to a display position of the thumbnail that is of the video and that is in the first to-be-shared content browsing region, a thumbnail of content arranged previous to the video in the first album is further included. Next to a display position of the thumbnail that is of the at least one photo and that is in the first to-be-shared content browsing region, a thumbnail of content arranged next to the at least one photo in the first album is further included. In the first album, the at least one photo is arranged next to the video. In this way, the user may further select other content to share.

When the user performs the first operation on the thumbnail that is of the video and that is displayed in the first album and the first album includes the video but does not include the at least one photo associated with the video, the first to-be-shared content browsing region includes the thumbnail of the video and a thumbnail of each photo associated with the video. In this implementation, a photo associated with the video may be displayed in the first to-be-shared content browsing region, to facilitate the user to share the photo associated with the video while sharing the video, thereby improving sharing efficiency and further improving user experience.

In this implementation, previous to a display position of the thumbnail that is of the video and that is in the first to-be-shared content browsing region, a thumbnail of content arranged previous to the video in the first album is further included. Next to the display position of the thumbnail that is of the video and that is in the first to-be-shared content browsing region, a thumbnail of content arranged next to the video in the first album is further included. In this way, the user may further select other content to share.

A being-selected identifier is displayed on the thumbnail that is of the video and that is in the first to-be-shared content browsing region, to indicate that the user has selected the video to share.

In a possible implementation, when the first album includes the video and the at least one photo associated with the video, the first album is an "all photos" album.

In a possible implementation, when the first album includes the video but does not include the at least one photo associated with the video, the first to-be-shared content browsing region includes the thumbnail of the video and the thumbnail that is of the at least one photo associated with the video and that is displayed based on a size of the first to-be-shared content browsing region. Due to the size of the first to-be-shared content browsing region, not all thumbnails are displayed. Therefore, the user may browse the content in the first to-be-shared content browsing region by swiping leftward and rightward or upward and downward or in another manner. The second to-be-shared content browsing region may refer to the first to-be-shared content browsing region. For example, the first to-be-shared content browsing region includes the thumbnail of the video and a part of a thumbnail of a photo in the at least one photo.

In a possible implementation, when the first to-be-shared content browsing region includes the thumbnail of the video and the thumbnail of each photo associated with the video, the user may further select a photo to share. If an operation in which the user selects a thumbnail of a target photo in the at least one photo is detected in the first to-be-shared content browsing region, correspondingly, the terminal shares the video and the target photo with the target terminal in response to the operation of the user on the identifier of the target user.

In a possible implementation, the user may further select a target photo in the first interface to share.

For example, the terminal displays a target photo in the display region in response to an operation of the user on an identifier of the target photo in the at least one photo in the first interface. Correspondingly, the target photo is shared with the target terminal in response to the user operating the share control.

The terminal displays a second sharing interface in response to the user operating the share control. The second sharing interface includes a second to-be-shared content browsing region and a sharing selection region. The sharing selection region may be the same as the sharing selection region in the first sharing interface, which may refer to the foregoing related descriptions.

Different from the first to-be-shared content browsing region, the second to-be-shared content browsing region includes a thumbnail of the target photo, the thumbnail of the video, and a thumbnail of another photo associated with the video. A being-selected identifier is displayed on the thumbnail of the target photo. The sharing selection region includes an identifier of a to-be-shared user. In this way, the terminal shares the target photo with the target terminal in response to an operation of the user on an identifier of a target user in the identifier of the to-be-shared user. The target terminal is a terminal corresponding to the target user.

In a possible implementation, in the second to-be-shared content browsing region, the thumbnail of the video is arranged previous to the thumbnail of the target photo, and the thumbnail of another photo associated with the video is arranged next to the thumbnail of the target photo.

In this implementation, previous to a display position of the thumbnail that is of the video and that is in the second to-be-shared content browsing region, a thumbnail of content arranged previous to the video in the first album is further included. Next to a display position of the thumbnail that is of the another photo associated with the video and that is in the second to-be-shared content browsing region, a thumbnail of content arranged next to the video in the first album is further included. In this implementation, the user may be enabled to share other content (in addition to the video and the photo associated with the video), so that user experience can be improved.

In a possible implementation, the user may further multi-select and share a video and a photo.

A second interface is displayed in the gallery application in response to a second operation (such as touching and holding) of the user on the thumbnail that is of the video and that is displayed in the first album or the photo tab. The identifier on the second interface indicating that the photo is associated with the video disappears. A being-selected identifier is displayed on the thumbnail of the video. In addition, the share control may also be displayed on the second interface for the user to share the video and the photo associated with the video, which may refer to a sharing process in the first interface.

According to a second aspect, an embodiment of this application provides a human-machine interaction apparatus. The human-machine interaction apparatus may be the terminal or the chip in the terminal in the first aspect. The human-machine interaction apparatus includes:

a display module, configured to display, in a gallery application, a first interface in response to a first operation of a user on a thumbnail that is of a video and that is displayed in a first album or a photo tab, where a picture of the video is displayed in a display region of the first interface, the first interface further includes an association region and an operation region, the association region includes an identifier of the video and an identifier of at least one photo associated with the video, the at least one photo is generated based on the video, and the operation region includes a share control; and a transceiver module, configured to share the video with a target terminal in response to the user operating the share control.

In a possible implementation, the display module is specifically configured to display a first sharing interface in response to the user operating the share control. The first sharing interface includes a first to-be-shared content browsing region and a sharing selection region. Content included in the first to-be-shared content browsing region is related to the first album or the photo tab to which the video belongs. The sharing selection region includes an identifier of a to-be-shared user.

The transceiver module is specifically configured to share the video with the target terminal in response to an operation of the user on an identifier of a target user in the identifier of the to-be-shared user. The target terminal is a terminal corresponding to the target user.

In a possible implementation, when the user performs the first operation on the thumbnail that is of the video and that is displayed in the first album and the first album includes the video and the at least one photo associated with the video, the first to-be-shared content browsing region includes the thumbnail of the video.

When the user performs the first operation on the thumbnail that is of the video and that is displayed in the first album and the first album includes the video but does not include the at least one photo associated with the video, the first to-be-shared content browsing region includes the thumbnail of the video and a thumbnail of each photo associated with the video.

A being-selected identifier is displayed on the thumbnail that is of the video and that is in the first to-be-shared content browsing region.

In a possible implementation, when the first album includes the video and the at least one photo associated with the video, the first album is an "all photos" album.

In a possible implementation, when the first album includes the video but does not include the at least one photo associated with the video, the first to-be-shared content browsing region includes the thumbnail of the video and a part of a thumbnail of a photo in the at least one photo.

In a possible implementation, when the first to-be-shared content browsing region includes the thumbnail of the video and the thumbnail of each photo associated with the video, a processing module is configured to detect, in the first to-be-shared content browsing region, an operation in which the user selects a thumbnail of a target photo in the at least one photo.

The transceiver module is specifically configured to share the video and the target photo with the target terminal in response to the operation of the user on the identifier of the target user.

In a possible implementation, when the first album includes the video and the at least one photo associated with the video, previous to a display position of the thumbnail that is of the video and that is in the first to-be-shared content browsing region, a thumbnail of content arranged previous to the video in the first album is further included. Next to a display position of the thumbnail that is of the at least one photo and that is in the first to-be-shared content browsing region, a thumbnail of content arranged next to the at least one photo in the first album is further included. In the first album, the at least one photo is arranged next to the video.

When the first album includes the video but does not include the at least one photo associated with the video, previous to a display position of the thumbnail that is of the video and that is in the first to-be-shared content browsing region, a thumbnail of content arranged previous to the video in the first album is further included. Next to the display position of the thumbnail that is of the video and that is in the first to-be-shared content browsing region, a thumbnail of content arranged next to the video in the first album is further included.

In a possible implementation, the display module is further configured to display a target photo in the display region in response to an operation of the user on an identifier of the target photo in the at least one photo in the first interface.

The transceiver module is further configured to share the target photo with the target terminal in response to the user operating the share control.

In a possible implementation, the display module is specifically configured to display a second sharing interface in response to the user operating the share control. The second sharing interface includes a second to-be-shared content browsing region and a sharing selection region. The second to-be-shared content browsing region includes a thumbnail of the target photo, the thumbnail of the video, and a thumbnail of another photo associated with the video. A being-selected identifier is displayed on the thumbnail of the target photo. The sharing selection region includes an identifier of a to-be-shared user.

The transceiver module is specifically configured to share the target photo with the target terminal in response to an operation of the user on an identifier of a target user in the identifier of the to-be-shared user. The target terminal is a terminal corresponding to the target user.

In a possible implementation, in the second to-be-shared content browsing region, the thumbnail of the video is arranged previous to the thumbnail of the target photo, and the thumbnail of another photo associated with the video is arranged next to the thumbnail of the target photo.

In a possible implementation, previous to a display position of the thumbnail that is of the video and that is in the second to-be-shared content browsing region, a thumbnail of content arranged previous to the video in the first album is further included. Next to a display position of the thumbnail that is of the another photo associated with the video and that is in the second to-be-shared content browsing region, a thumbnail of content arranged next to the video in the first album is further included.

In a possible implementation, the thumbnail that is of the video and that is displayed in the first album or the photo tab includes an identifier indicating that a photo is associated with the video. The identifier of the video is a thumbnail of a first frame (picture) of the video, and an identifier of each photo associated with the video is a thumbnail of each photo.

In a possible implementation, the display module is further configured to display, in the gallery application, a second interface in response to a second operation of the user on the thumbnail that is of the video and that is displayed in the first album or the photo tab. The identifier on the second interface indicating that the photo is associated with the video disappears. A being-selected identifier is displayed on the thumbnail of the video.

According to a third aspect, an embodiment of this application provides an electronic device. The electronic device may include a processor and a memory. The memory is configured to store computer-executable program code. The program code includes instructions. When the processor executes the instructions, the instructions enable the electronic device to perform the method according to the first aspect.

According to a fourth aspect, an embodiment of this application provides a computer program product including instructions. When the computer program product runs on a computer, the computer is enabled to perform the method according to the first aspect.

According to a fifth aspect, an embodiment of this application provides a computer-readable storage medium. The computer-readable storage medium stores instructions. When the instructions are run on a computer, the computer is enabled to perform the method according to the first aspect.

For beneficial effects of the possible implementations of the second aspect to the fifth aspect, refer to beneficial effects brought by the first aspect. Details are not described herein.

BRIEF DESCRIPTION OF THE DRAWINGS

FIG. 3A(1) and FIG. 3A(2) are a schematic diagram of an interface of a terminal according to an embodiment of this application;

FIG. 3B(1) to FIG. 3B(4) are a schematic diagram of another interface of a terminal according to an embodiment of this application;

FIG. 4A(1) to FIG. 4A(4) are a schematic diagram of an interface of sharing gallery data according to an embodiment of this application;

FIG. 4B(1) to FIG. 4B(4) are a schematic diagram of another interface of sharing gallery data according to an embodiment of this application;

FIG. 4C(1) to FIG. 4C(4) are a schematic diagram of another interface of sharing gallery data according to an embodiment of this application;

FIG. 4D(1) and FIG. 4D(2) are a schematic diagram of another interface of sharing gallery data according to an embodiment of this application;

FIG. 4E(1) and FIG. 4E(2) are a schematic diagram of another interface of sharing gallery data according to an embodiment of this application;

FIG. 6 is a schematic flowchart of a human-machine interaction method according to an embodiment of this application;

FIG. 7 is a schematic diagram of a structure of a human-machine interaction apparatus according to an embodiment of this application; and FIG. 8 is a schematic diagram of a structure of a terminal according to an embodiment of this application.

DETAILED DESCRIPTION OF THE EMBODIMENTS

Figure 1A:
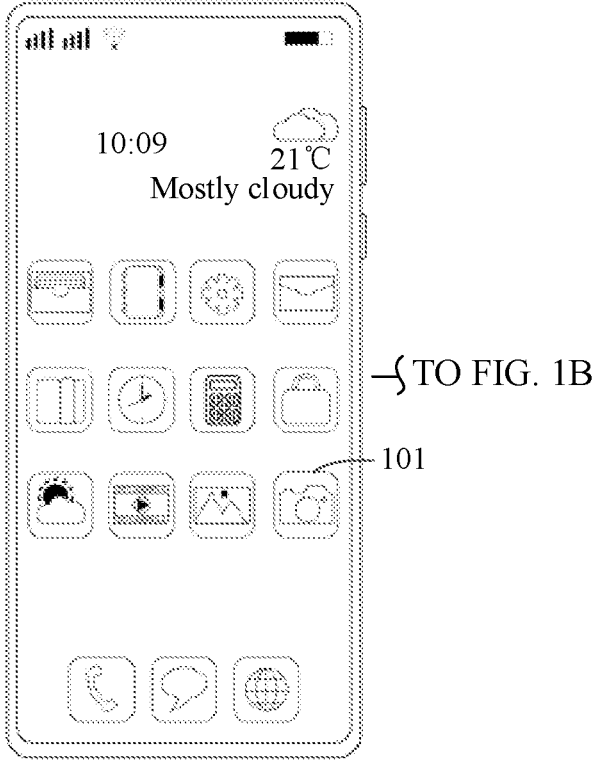
FIG. 1A to FIG. 1D are a schematic diagram of an interface of a magic take function according to an embodiment of this application.

The human-machine interaction method disclosed in embodiments of this application is applied to a terminal. The terminal includes, but is not limited to, an electronic device with a camera, such as a mobile phone, a tablet computer, a desktop computer, a laptop computer, a notebook computer, an ultra-mobile personal computer (Ultra-Mobile Personal Computer, UMPC), a handheld computer, a netbook, a personal digital assistant (Personal Digital Assistant, PDA), a wearable electronic device, or a smartwatch. A form of the terminal is not limited in embodiments of this application.

Before embodiments of this application are described, some terms or concepts in embodiments of this application are first explained. It should be understood that, names of the following terms are not specifically limited in this application. The following terms may have other names. Renamed terms still satisfy the following related term explanations.

Explanation of terms in this application:

An original video is a video shot by a user by using a terminal.

A magic moment (magic moment, MM) refers to an instant of some wonderful pictures in a video recording (or shooting) process. For example, the MM may be an optimal motion instant, an optimal expression moment, or an optimal check-in action. It may be understood that the term MM is not limited in this application, and MM may also be referred to as a beautiful moment, a splendid moment, a wonderful instant, a decisive instant, a wonderful key frame, a best shot (best shot, BS), or the like. In different scenarios, the magic moment may be a different type of picture instants. For example, when a video of a football match is recorded, the magic moment may be an instant at which a foot of an athlete is in contact with a football at the time of shooting or passing the football, or the magic moment may be an instant at which the football flies into a goal. When a video in which a character jumps from the ground is recorded, the magic moment may be an instant at which the character is at the highest point in the air, or may be an instant at which a motion of the character in the air is most stretching.

An MM tag (TAG) is a time tag. The MM tag indicates a position of a magic moment in a recorded video. For example, a video may correspond to one or more MM tags. The MM tags may indicate that at moments of the $10^{th}$ second, the $1^{st}$ minute and the $20^{th}$ second, and the like of the video, corresponding image frames (or video frames) in the video are magic moments.

An artificial intelligence (artificial intelligence, AI) photo is a video frame corresponding to a magic moment in an original video. In an embodiment, the AI photo may be referred to as a wonderful instant photo. For example, the AI photo may be a video frame in which a user laughs, a video frame in which the user jumps the highest, or a video frame in which the user looks back, included in the original video. In an embodiment, when the user shoot a video by using a terminal, an AI photo may be obtained and stored.

Magic take (function) may be understood as a function in which when shooting a video by using a camera application in a terminal, a user can obtain a shot original video, one or more magic moment photos, and an AI configuration file by pressing a "shoot" control once.

The AI configuration file is obtained based on the original video. In an embodiment, the AI configuration file records information, such as a scenario in which the user shoots a video and a wonderful key frame. For example, the AI configuration file may include an identifier of at least one scenario in the original video and an identifier of a key frame (such as an identifier of an AI photo). For example, the original video includes a scenario 1 "aquarium", a scenario 2 "amusement park", an identifier 1 of a key frame in the scenario 1 "aquarium", and an identifier 2 of a key frame in the scenario 2 "aquarium". For another example, the information recorded in the AI configuration file may be specifically a MM tag, a video overall scenario tag, a segment scenario tag, a storyboard tag, a tag of high-quality video frame, and the like. In an embodiment, a tag may be understood as an identifier.

The video overall scenario tag may also be referred to as a video overall abstract tag, and mainly indicates an overall shooting scenario of a video. The term of the video overall scenario tag is not limited in this application. For example, the video overall shooting scenario may be a food tag, a night scene tag, and the like.

An implementation process of the magic take may be as follows: A magic moment is automatically identified and snapshotting is triggered during video recording to obtain a photo of the MM; after the recording ends, the photo of the magic moment MM and a wonderful short video (which is also referred to as a selected short video, a wonderful video, a selected video, or an AI video) may be recommended to the user when the user views the recorded video. It may be understood that duration of the wonderful short video obtained by using the magic take is less than duration of a complete video. For example, a complete recorded complete video is one minute. In this case, four magic moment photos and a wonderful short video with duration of 15 seconds can be obtained. The magic take may alternatively have other names, for example, magic obtain, magic shoot, instant film, instant movie, or AI instant movie.

An AI video is generated based on an AI configuration file. For example, the AI video may be a 5 s-video that includes content before and after a key frame with an identifier 1, and a 5 s-video that includes content before and after a key frame with an identifier 2. In other words, the AI video is a 10 s-video. Alternatively, for example, the AI video may be a 5 s-video that includes content of a scenario 1 "aquarium", and a 5 s-video that includes content of a scenario 2 "amusement park".

In an embodiment, after the magic take is completed, the AI video may not be generated but the AI video configuration file may be generated and stored. In a case that a user does not browse the AI video, storage space can be saved. In an embodiment, the user may trigger a terminal to generate an AI video in an original video playback interface. For example, the user may operate an instant movie control 351 displayed in FIG. 3B(3), to trigger the terminal to generate an AI video, which may refer to related descriptions in FIG. 3B(1) to FIG. 3B(4).

A process of generating the AI photo and the AI configuration file based on the original video, and generating the AI video based on the AI configuration file is not described in this embodiment of this application.

In embodiments of this application, an operation manner of the user on objects, such as a control and an icon in a graphical user interface (graphical user interface, GUI), includes but is not limited to touching a specific control on a mobile phone screen, pressing a specific physical button or a button combination, inputting voice, and an air gesture. In the following embodiments, an example in which the user operates the control in the GUI is used for description.

For example, refer to FIG. 1A to FIG. 1D. An example in which a terminal is a mobile phone is used. In this embodiment of this application, a process of recording a video by using a "magic take" mode (or function) includes:

As shown in FIG. 1A, a main interface is displayed on a screen of the mobile phone. The main interface displays application icons of a plurality of applications (application, App). The user can trigger the mobile phone to start a camera application (which is referred to as a camera below) by tapping a "camera" application icon 101 on a desktop of the mobile phone, and the mobile phone displays a shooting interface shown in FIG. 1B.

Figure 1B:
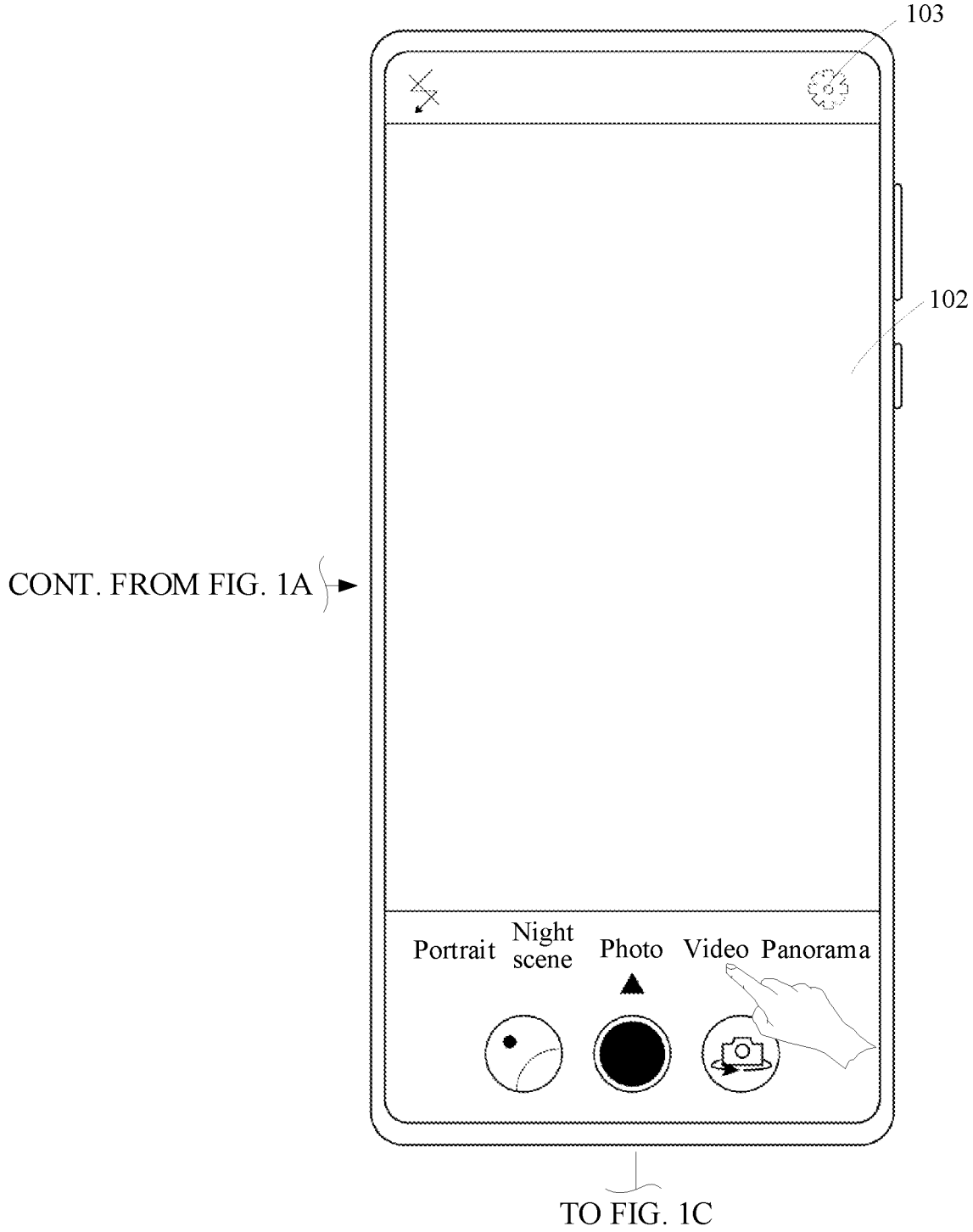

As shown in FIG. 1B, the shooting interface of the camera generally includes a plurality of controls, such as a viewfinder frame 102, a photo control, a video control, and a settings control 103 (for example, a portrait functional control, a night scene functional control, or more other controls). The user can start a video recording mode by tapping the video control, and the mobile phone can display a recording interface shown in FIG. 1C. The user can enter a setting interface of the camera by tapping the "settings" control 103, and the mobile phone displays an interface shown in FIG. 1D.

Figure 1C:
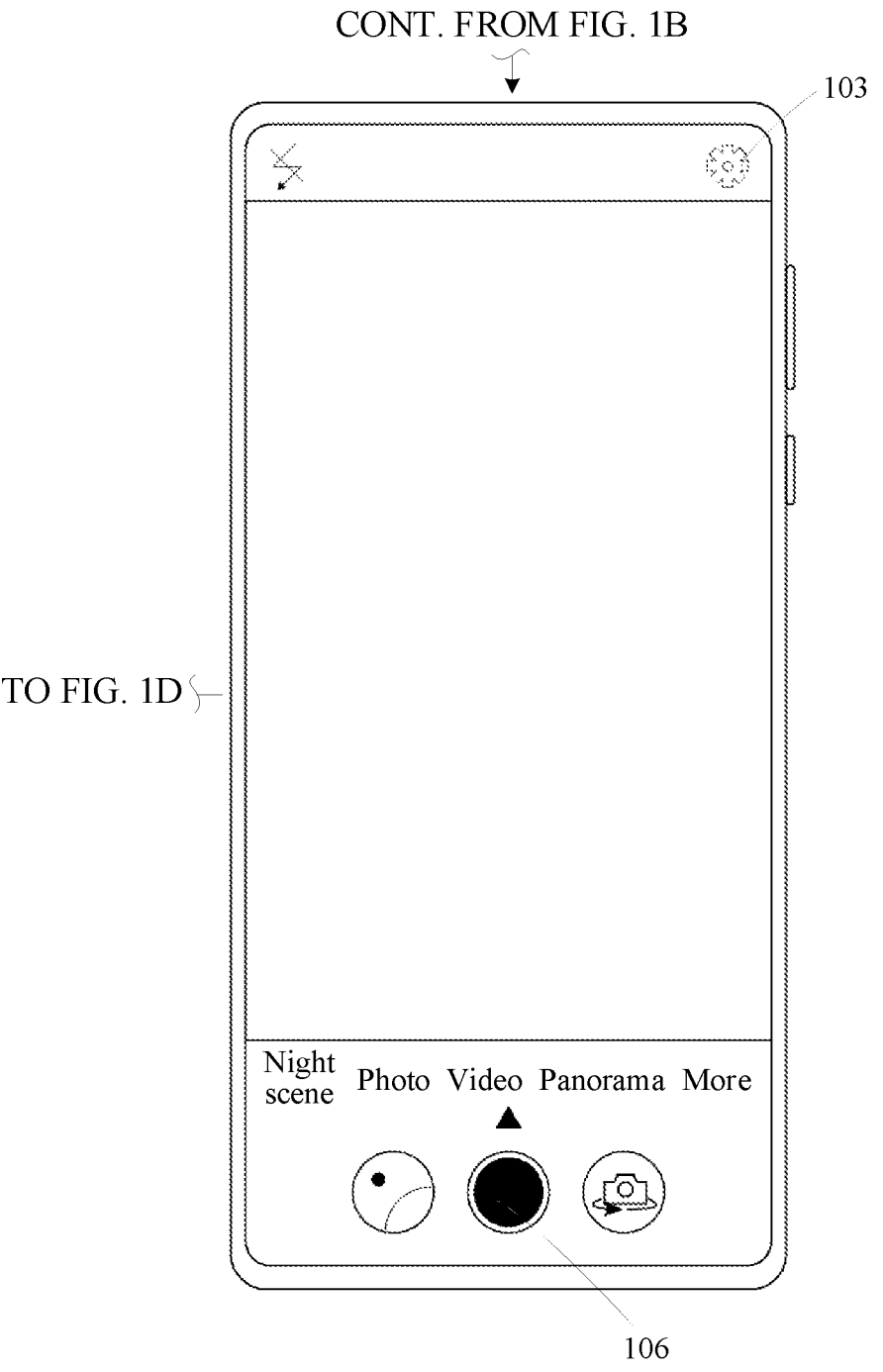
Figure 1D:
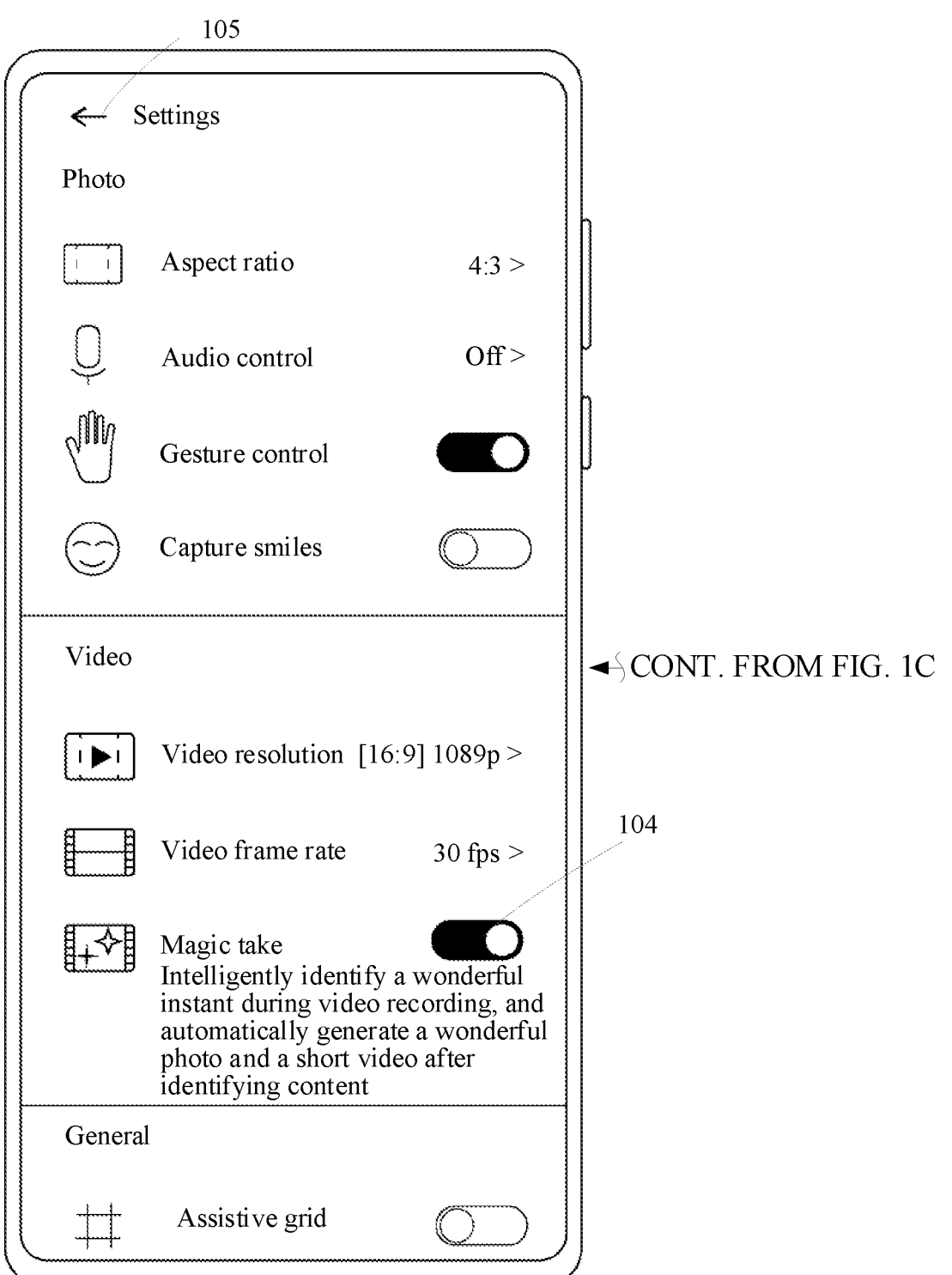

The interface shown in FIG. 1D displays an option 104 for enabling "magic take", to enable a magic take function. In other words, after the user enable the magic take, an original video, an AI photo, and an AI configuration file are obtained when the mobile phone records a video. Certainly, the user may alternatively disable the magic take function by using the option 104.

In an embodiment, the setting interface shown in FIG. 1D may further include a control for a minimum time limit. The control for the minimum time limit is used for limiting minimum recording duration for enabling the magic take function. If recording duration of a video is less than the minimum recording duration, a magic take feature of the video cannot be called back. For example, the minimum time limit may be set to 15 s, and when shooting time of the user is less than 15 s, no photo of the magic take is called back.

It may be understood that the setting interface shown in FIG. 1D may alternatively include other controls with respect to video recording settings, for example, a control for setting video resolution and a control for setting a video frame rate. The controls shown in FIG. 1D are merely examples for description.

After enabling the magic take function, the user taps a return control 105 shown in FIG. 1D, and the mobile phone may return to the interface shown in FIG. 1C. Then, the user taps a recording control 106 to record a video. In some other embodiments, the option of the magic take is enabled by default. The user may not need to tap the settings control 103 shown in FIG. 1C, but directly tap the recording control 106 shown in FIG. 1C to record a video in the magic take mode.

Figure 2A:
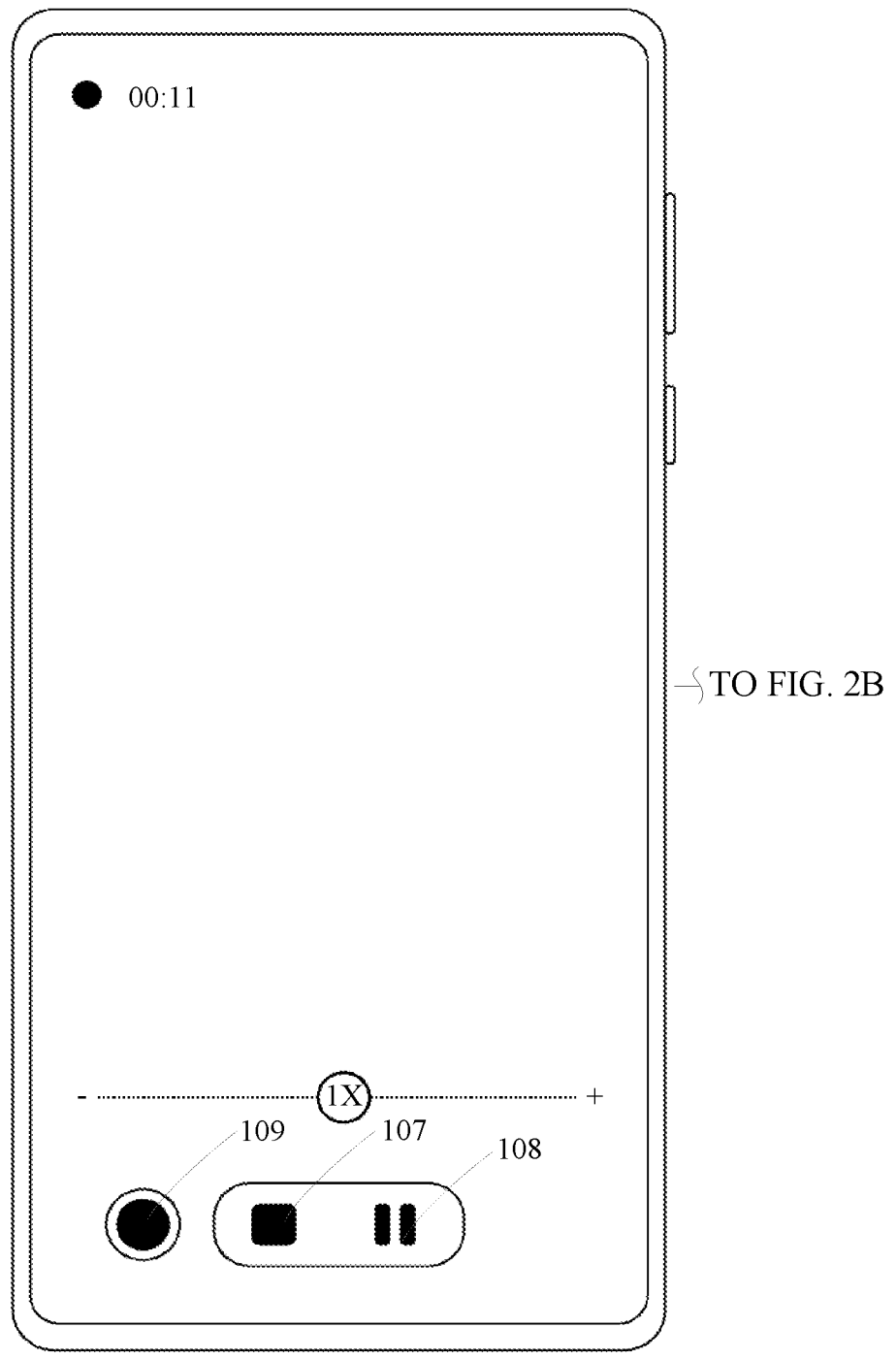
FIG. 2A and FIG. 2B are a schematic diagram of an interface of using a magic take function according to an embodiment of this application.
Figure 2B:
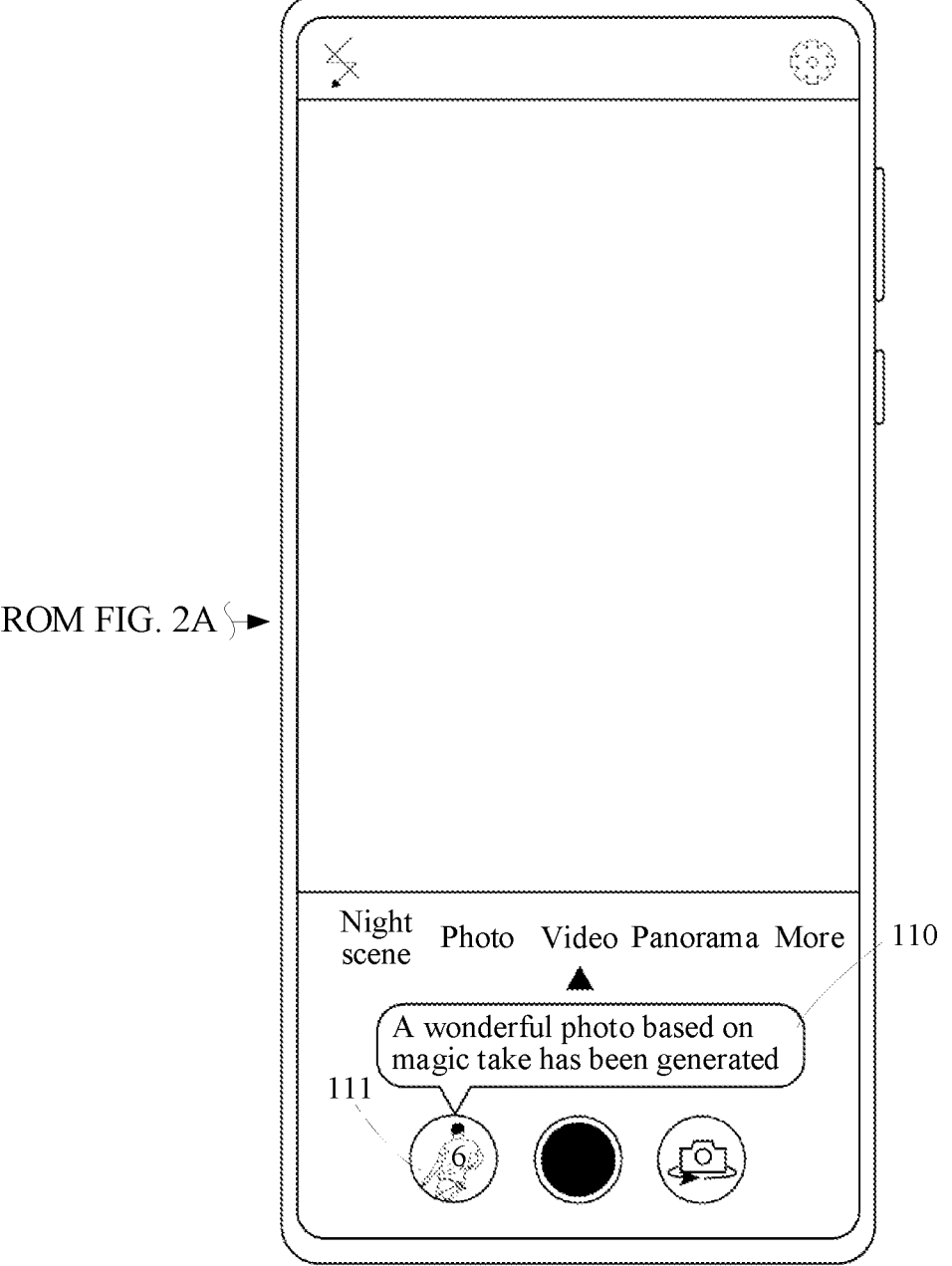

FIG. 2A and FIG. 2B are a schematic diagram of an interface of using a magic take function according to an embodiment of this application. FIG. 2A shows a picture (for example, a picture at the $11^{th}$ second) in a recording process of using a magic take function by a terminal. An interface shown in FIG. 2A includes a video recording stop control 107, a video recording pause control 108, and a photographing key 109. During video recording, a user can manually snapshot a photo by tapping the photographing key 109. When the user taps the video recording stop control 107 in FIG. 2A, the recording process ends. In this case, a mobile phone interface displays an interface shown in FIG. 2B. The interface shown in FIG. 2B is a preview interface after the recording ends. A balloon window 110 may pop up in the interface, and the window 110 displays content "a magic moment photo based on magic take has been generated", to prompt the user to view an AI photo.

A preview image 111 in FIG. 2B is a thumbnail of a recorded original video. If tapping the preview image 111, the user can enter a gallery application (or referred to as a gallery or a gallery application) to view the recorded original video, the AI photo, and the like. Playback and display of the original video and display of the AI photo may refer to related descriptions in the following embodiments.

It should be understood that the original video shot by the terminal may be stored in the gallery application of the terminal, and the AI photo and an AI video may also be stored in the gallery application. In an embodiment, videos and photos stored in the gallery application may be referred to as gallery data. In an embodiment, the gallery data may be displayed in a form of albums, in a form of photo tabs (tab), and the like. For example, FIG. 3A(1) is an interface that displays gallery data in a form of albums and that of a gallery application according to this embodiment of this application. The interface may include an albums control 31, a photos control 32, and at least one album 33.

Refer to FIG. 3A(1) and FIG. 3A(2). The gallery application includes at least one album, such as a camera album, an all photos album, a videos album, a screenshots and screen recordings album, a favorites album, and another album added through user definition. In an embodiment, the albums in the gallery may be divided into a physical album and a virtual album. The camera album, the screenshots and screen recordings album, and the another album added through the user definition are physical albums, while the all photos album and the videos album are virtual albums. It should be understood that the physical album may be understood as a real path used for storing the gallery data. The virtual album may be understood as an album that aggregates videos and photos based on features of the videos and photos. For example, compared with a photo, a video includes a plurality of video frames and has a dynamic feature. Therefore, videos shot by a terminal may be aggregated in the "videos" album, and the "videos" album is a virtual album.

In an embodiment, AI photos generated based on an original video may be independently stored in a physical album, such as an "AI photos" album, as shown in FIG. 3A(1). A name of an album that stores the AI photos is not limited in this embodiment of this application. For example, the album may also be referred to as a "magic take" album.

Refer to FIG. 3A(1). The user taps the photos control 32, and the terminal may display an interface that displays the gallery data in a form of photo tabs. Refer to FIG. 3A(2). The interface that displays the gallery data in the form of the photo tabs may include the album control 31, the photos control 32, and photos displayed in a time sequence. In an embodiment, the interface of the photo tab may display photos and videos in the camera album and photos in the screenshots and screen recordings album.

In an embodiment, to distinguish between the original video based on which the AI photos have been generated and a common video (based on which no AI photo has been generated), when a cover of the original video is displayed in the camera album, the videos album, or the another album added through the user definition, an identifier may be added on the cover of the original video. The identifier indicates that the AI photos have been generated based on the original video. For example, FIG. 3B(1) is the same as FIG. 3A(1). When the user taps the camera album 33, the terminal may display a thumbnail of a photo and a cover of a video included in the camera album. For example, an identifier "AI" 34 may be displayed on a cover of a video 1 to indicate that the video 1 is an original video based on which AI photos have been generated, as shown in FIG. 3B(2).

In an embodiment, when the original video does not include a wonderful photo, in other words, no AI photo is generated, if an AI configuration file is generated based on the original video, an identifier "AI" 34 may be displayed on a cover of a video 1. It should be understood that this embodiment of this application includes a scenario in which "the AI photos have been generated based on the original video".

Because the AI photos generated based on the original video are associated with the original video, in other words, the original video is associated with the AI photos generated based on the original video, in this embodiment of this application, when viewing the original video, the user can view the AI photos associated with the original video on a playback interface of the original video.

In an embodiment, the AI photos may be displayed in association on a playback interface of the original video in the camera album, but the AI photos are not displayed in association on a playback interface of the original video in virtual albums such as all photos and videos, my favorites, recycle bin, a smart album, a map album, search results, a hidden album, and a shared album.

In an embodiment, the AI photos may be displayed in association on a playback interface of the original video in the camera album, an all photos album, a videos album, my favorites, a smart album, a map album, and search results, but the AI photos are not displayed in association on a playback interface of the original video in recycle bin, a hidden album, and a shared album.

In an embodiment, an album that is displayed in association and an album that is not displayed in association may be preset.

In an embodiment, when the user taps the cover of the original video, the terminal can play the original video. For example, refer to FIG. 3B(2). The user taps the cover of the video 1 (a thumbnail, which may be a picture of a first frame of the video), and the terminal may play the video 1 (or the terminal may display the video 1 and a pause control, and the user can trigger the terminal to play the video 1 by operating the pause control). In an embodiment, as shown in FIG. 3B(3), an interface of playing the video 1 may include a playback region 35, an association region 36, and an operation region 37. In an embodiment, that the user taps the cover of the video 1 may be referred to as a first operation. In an embodiment, the interface shown in FIG. 3B(3) may be referred to as a first interface. It should be understood that in this embodiment of this application, in FIG. 3(3), an example in which the video 1 has been played for a period of time is used.

The playback region 35 may display the picture of the video 1. In an embodiment, the terminal may directly display the picture of the video 1 in the playback region 35 in response to the user tapping the cover of the original video. Alternatively, in an embodiment, the terminal may display the picture of the first frame of the video 1 and the pause control in the playback region 35 in response to the user tapping the cover of the original video. In an embodiment, the terminal may start to display the picture of the video 1 in the playback region 35 in response to the user tapping the pause control. A form of playing the video 1 is not limited in this application. In an embodiment, the playback region 35 may be referred to as a display region.

In an embodiment, the playback region 35 may display an icon 351, such as an identifier of "instant movie". The user can trigger the terminal to generate the AI video based on the AI configuration file by tapping the identifier of "instant movie". This process is not described in this embodiment of this application. This embodiment of this application does not include an instant movie function. Therefore, an identifier of "instant movie" is not shown in the following accompanying drawings.

In an embodiment, the playback region 35 may alternatively display a playback time progress bar 352 of the video 1, to facilitate the user to perform adjustment, an operation, and the like on the playback progress of the video 1. It should be understood that the following embodiments do not include the adjustment on the playback progress of the video 1. Therefore, the playback time progress bar 352 of the video 1 is not shown.

The association region 36 may include a thumbnail of the cover of the original video (the video 1) and a thumbnail of the AI photo associated with the original video. In FIG. 3B(3), the video 1 and the AI photos associated with the video 1 are indicated by texts. For example, the AI photos associated with the video 1 may include an AI photo 1, an AI photo 2, and an AI photo 3. It should be understood that in an embodiment, a thumbnail may be understood as a picture after an original picture is reduced. The user can trigger the terminal to switch content displayed in the playback region 35 by tapping different thumbnails. It should be understood that in FIG. 3B(3), due to a page size, the AI photo 3 is not fully displayed. In an embodiment, the thumbnail of the cover of the video 1 displayed in the association region 36 may be referred to as an identifier of the video 1, and the thumbnail of the AI photo associated with the original video may be referred to as an identifier of a photo. In this embodiment of this application, the thumbnails are used for indicating the identifier of the video 1 and the identifier of the photo. Certainly, texts or another form may also be used for indicating the identifier of the video 1 and the identifier of the photo. This is not limited in this embodiment of this application.

For example, the playback region 35 in FIG. 3B(3) is playing the video 1. If the user taps the AI photo 1, the terminal can display the AI photo 1 in the playback region 35, as shown in FIG. 3B(4). When the user re-taps the thumbnail of the cover of the video 1, the terminal can continue to play the video 1 in the playback region 35. In other words, the terminal can continue to play the video 1 following the playback progress of the video 1 in FIG. 3B(3).

The first operation region 37 may include, but is not limited to, a share control 371, a delete control 372, and a more control 373. Controls included in the first operation region 37 are not limited in this embodiment of this application. FIG. 3B(1) to FIG. 3B(4) show the controls and another control used in this embodiment of this application, which may refer to the accompanying drawings. The following embodiments introduces a process in which the user operates the share control 371 to trigger the terminal to perform corresponding operations.

It should be understood that in an embodiment, when the photo tab includes the video 1, the user may alternatively play the video 1 in the photo tab to display a same interface as that in FIG. 3B(3). Operations performed in the interface may refer to related descriptions of the following embodiments.

In an embodiment, the following describes, by using "large image sharing" and "multi-selecting and sharing", a process of sharing gallery data by a terminal. It should be understood that the following embodiments use an album as an example for description. A process of opening a video 1 in a photo tab to share may refer to related descriptions of a camera album in the following embodiments.

1. Large Image Sharing

The large image sharing refers to a photo sharing operation performed on an interface that is of the terminal and that displays the video 1 or AI photos associated with the video 1.

(1) Original Video Sharing

Scenario 1:

In an embodiment, in the large picture sharing, when the interface of the terminal displays the video 1 or the AI photos, and when sharing the video 1 or the AI photos, the terminal may not display associated content on a sharing interface, and share to-be-shared content in an order arranged in the album.

For example, using an all photos album as an example, in a scenario in which the all photos album displays the AI photos in association when the video 1 is displayed, the all photos album includes the video 1 and the AI photos associated with the video 1. In addition, in the all photos album, the AI photos associated with the video 1 are arranged next to the video 1 in a precedence order in the video 1. When a user shares the video 1, if the sharing interface of the video 1 displays the AI photos associated with the video 1, content next to the video 1 in the all photos album is also displayed next to the AI photos associated with the video 1, to be specific, the AI photos associated with the video 1. This causes repeated AI photos on the sharing interface, which affects selection efficiency of the user and results in poor user experience.

Figure 4A:
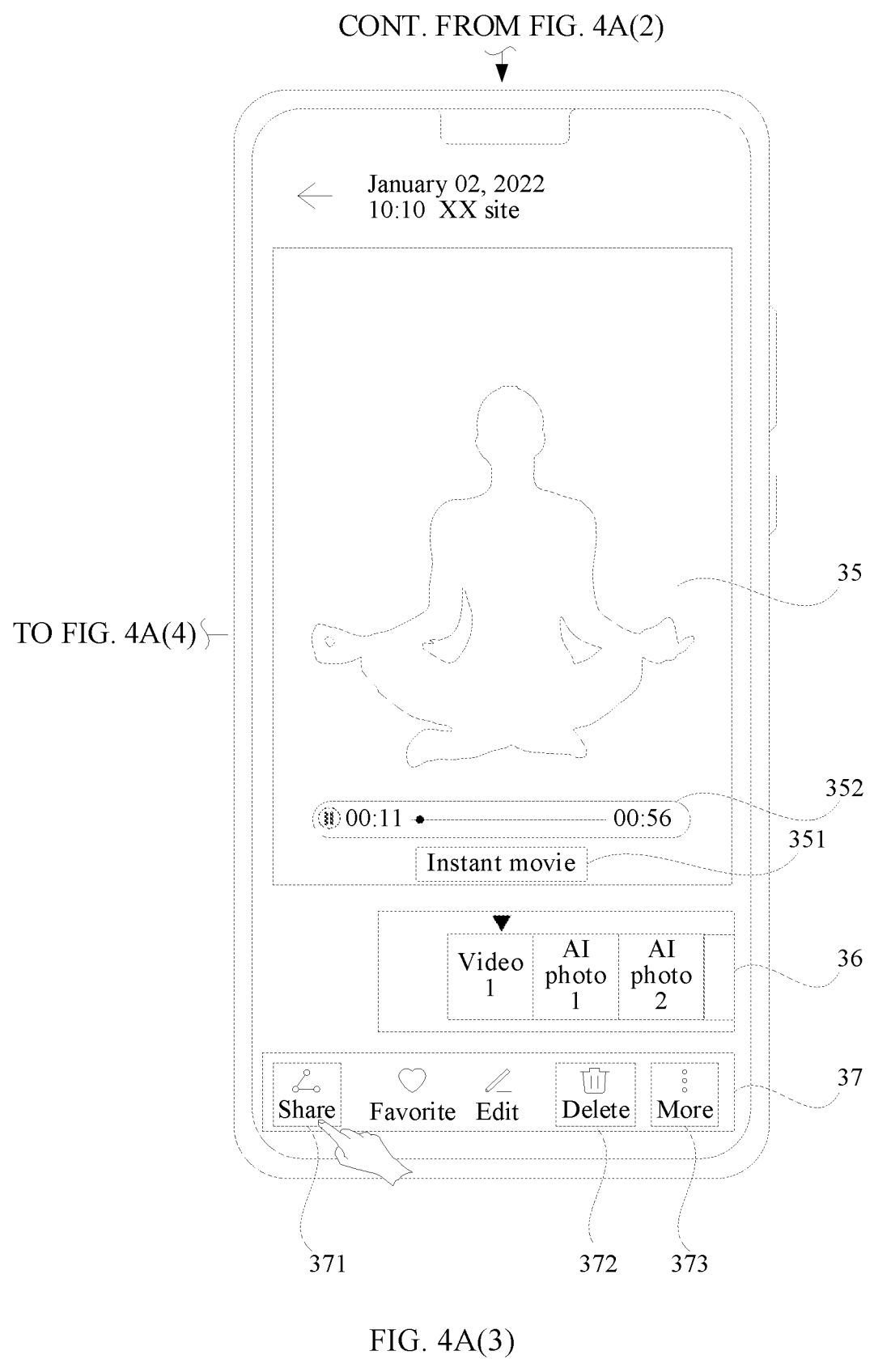

For example, as shown in FIG. 4A(1) to FIG. 4A(3), the user opens the video 1 in the all photos album. FIG. 4A(3) is the same as FIG. 3B(3). When the interface of the terminal displays an original video (the video 1), the user taps a share control 371 in a first operation region 37, and the terminal can display the sharing interface. Refer to FIG. 4A(4). The sharing interface may include a to-be-shared content browsing region 41 and a sharing selection region 42. The sharing selection region 42, content, identifiers, and the like included in the sharing selection region 42 may refer to related descriptions in FIG. 4B(1) to FIG. 4B(4).

In an embodiment, the to-be-shared content browsing region 41 may include a thumbnail of to-be-shared content. If the sharing interface display the AI photos associated with the video 1, the to-be-shared content includes the video 1, an AI photo 1, an AI photo 2, and an AI photo 3 associated with the video 1, previous content of the video 1 in the all photos album displayed previous to the video 1, and next content of the video 1 in the all photos album displayed next to the video 1, such as the AI photo 1, the AI photo 2, and the AI photo 3. In this way, when selecting the to-be-shared content, the user sees many repeated AI photos, which affects selection of the user. It should be understood that in FIG. 4A(4), to facilitate to display the content included in the to-be-shared content browsing region 41, the content included in the to-be-shared content browsing region 41 is expanded and displayed on a lower side of FIG. 4A(4). It should be understood that some of the photos in the to-be-shared content browsing region 41 are indicated by texts in the accompanying drawings.

To resolve the problem, in this embodiment of this application, in a scenario in which the video 1 is shared in the all photos album, the sharing interface does not display the AI photos associated with the video 1. For example, refer to FIG. 4B(1) to FIG. 4B(3). The user opens the video 1 in the all photos album. FIG. 4B(1) to FIG. 4B(3) are the same as FIG. 4A(1) to FIG. 4A(3). Refer to the to-be-shared content browsing region 41 and the sharing selection region 42 in FIG. 4B(4). In an embodiment, the interface shown in FIG. 4B(4) may be referred to as a first sharing interface, and the to-be-shared content browsing region 41 in FIG. 4B(4) may be referred to as a first to-be-shared content browsing region.

Different from FIG. 4A(4), the to-be-shared content browsing region 41 in FIG. 4B(4) includes the video 1 and content arranged previous and next to the video 1 in the all photos album. For example, a photo 1 is arranged previous to the video 1, and the AI photo 1, the AI photo 2, the AI photo 3, and a photo 2 are arranged next to the video 1. Correspondingly, the to-be-shared content browsing region 41 may display a thumbnail of the photo 1, a thumbnail of the video 1, a thumbnail of the AI photo 3, a thumbnail of the AI photo 2, a thumbnail of the AI photo 1, and a thumbnail of the photo 2. It should be understood that in FIG. 4B(4), due to an interface size, the to-be-shared content browsing region 41 displays a half of the thumbnail of the AI photo 1, and the content included in the to-be-shared content browsing region 41 is expanded and displayed on a lower side of FIG. 4B(4). In an embodiment, the thumbnail of the video 1 may be a thumbnail of a picture of a first frame in the video 1.

In an embodiment, because the user taps the share control 371 on the interface which displays the video 1, intention of the user is to share the video 1. Therefore, a being-selected identifier is displayed on the thumbnail that is of the video 1 and that is displayed in the to-be-shared content browsing region 41, indicating that the video 1 has been selected and shared by the user. It should be understood that in FIG. 4B(4), that the video 1 is selected is indicated in a manner of selecting, such as a selecting identifier 411. In an embodiment, in the to-be-shared content browsing region 41, a thumbnail other than the thumbnail of the video 1 is in an unselected state. The unselected state is shown as a selecting identifier 412 on the photo 1 displayed in the to-be-shared content browsing region 41.

In an embodiment, the sharing selection region 42 includes a to-be-shared user region 421 and a sharing manner region 422. The to-be-shared user region 421 includes at least one identifier of a to-be-shared user. In FIG. 4B(4), a user 1 indicates the identifier of the to-be-shared user. The sharing manner region 422 includes at least one optional sharing manner, such as a Bluetooth sharing manner and a short message sharing manner. The sharing selection region 42 is not described in this embodiment of this application.

In an embodiment, when the original video (such as the video 1) is shared, an AI configuration file of the original video does not support sharing. However, an AI video generated based on the AI configuration file supports sharing. Details may refer to a video sharing process in conventional technologies. This is not described in this embodiment of this application.

In an embodiment, a solution of the scenario 1 is also applicable to another album that "stores the video 1 and the AI photos associated with the video 1".

Scenario 2: In an embodiment, in the large image sharing, when the interface of the terminal displays the video 1, and when sharing the video 1, the terminal may enable a user to simultaneously share the AI photos associated with the video 1.

In an embodiment, using the camera album as an example, if the camera album stores the video 1, but does not store the AI photos associated with the video 1, for example, an AI photos album stores the AI photos associated with the video 1, when the user triggers to display, in the camera album, the video 1 to share, the AI photos associated with the shared video 1 may be provided on the sharing interface. In this way, when needing to share the video 1 and the AI photos associated with the video 1, the user does not need to share in the camera album and the AI photos album in sequence. This embodiment of this application supports completing the sharing of "the video 1 and the AI photos associated with the video 1" in the camera album, which is highly efficient.

For example, in FIG. 4C(1) to FIG. 4C(3) are the same as FIG. 3B(1) to FIG. 3B(3). It should be understood that in the camera album, a photo 1 is arranged previous to the video 1, and a photo 2 is arranged next to the video 1. Refer to FIG. 4C(3). When the interface of the terminal displays an original video (the video 1), the user taps a share control 371 in a first operation region 37, and the terminal can display the sharing interface. Refer to FIG. 4C(4). The sharing interface may include a to-be-shared content browsing region 41 and a sharing selection region 42. The sharing selection region 42 may refer to the foregoing related descriptions. In an embodiment, the interface shown in FIG. 4C(4) may be referred to as a first sharing interface, and the to-be-shared content browsing region 41 in FIG. 4C(4) may be referred to as a first to-be-shared content browsing region.

In an embodiment, the to-be-shared content browsing region 41 may include a thumbnail of to-be-shared content. Because the video 1 is associated with the AI photos, in this embodiment of this application, to facilitate to share the video 1 and the AI photos associated with the video 1, the to-be-shared content browsing region 41 may display a thumbnail of the video 1, a thumbnail of the AI photo 1, a thumbnail of the AI photo 2, and a thumbnail of the AI photo 3 associated with the video 1. It should be understood that in FIG. 4C(4), due to an interface size, the to-be-shared content browsing region 41 does not display the thumbnail of the AI photo 2 and the thumbnail of the AI photo 3, and the to-be-shared content browsing region 41 displays a half of the thumbnail of the AI photo 1. To facilitate indicate that the to-be-shared content browsing region 41 in FIG. 4C(4) is different from that in FIG. 4B(4), content included in the to-be-shared content browsing region 41 is expanded and displayed on a lower side of FIG. 4C(4).

In an embodiment, because the user taps the share control 371 on the interface which displays the video 1, intention of the user is to share the video 1. Therefore, a being-selected identifier is displayed on the thumbnail that is of the video 1 and that is displayed in the to-be-shared content browsing region 41, indicating that the video 1 has been selected and shared by the user. In an embodiment, in the to-be-shared content browsing region 41, a thumbnail other than the thumbnail of the video 1 is in an unselected state.

In an embodiment, a solution of the scenario 2 is also applicable to another album and photo tab that "store the video 1 and display no AI photo associated with the video 1".

(2) AI Photo Sharing

In an embodiment, in the large picture sharing, similar to sharing the video 1, when the interface of the terminal displays an AI photo 1 associated with the video 1, and when sharing the AI photo 1, the terminal may enable a user to simultaneously share the video 1 associated with the AI photo 1 and other AI photos associated with the video 1, such as an AI photo 2 and an AI photo 3.

The following solutions of a scenario 1 and a scenario 2 are applicable to any album, photo tab, or a scenario in which an AI photo is opened in another form in the gallery application.

Scenario 1: A sharing interface of the AI photo 1 only displays the AI photo 1, the video 1 associated with the AI photo 1, and other AI photos associated with the video 1, such as the AI photo 2 and the AI photo 3.

An example in which the video 1 is opened in the camera album is used. FIG. 4D(1) is the same as FIG. 3B(4). When the interface of the terminal displays the AI photo 1 associated with the video 1, the user taps a share control 371 in a first operation region 37, and the terminal can display the sharing interface. Refer to FIG. 4D(2). The sharing interface may include a to-be-shared content browsing region 41 and a sharing selection region 42. The sharing selection region 42 may refer to the foregoing related descriptions. In an embodiment, the interface shown in FIG. 4D(2) may be referred to as a first sharing interface, and the to-be-shared content browsing region 41 in FIG. 4D(2) may be referred to as a second to-be-shared content browsing region.

In an embodiment, refer to FIG. 4D(2). The to-be-shared content browsing region 41 may include a thumbnail of the AI photo 1, a thumbnail of the video 1, a thumbnail of the AI photo 2, and a thumbnail of the AI photo 3 associated with the video 1. It should be understood that in FIG. 4D(2), due to an interface size, the to-be-shared content browsing region 41 does not display the thumbnail of the AI photo 2 and the thumbnail of the AI photo 3, and the to-be-shared content browsing region 41 displays the thumbnail of the AI photo 1 and a half of the thumbnail of the video 1. To facilitate indicate content included in the to-be-shared content browsing region 41, the content included in the to-be-shared content browsing region 41 is expanded and displayed on a right side of FIG. 4D(2).

A precedence order of the thumbnail of the AI photo 1, the thumbnail of the AI photo 2, and the thumbnail of the AI photo 3 associated with the video 1 displayed in the to-be-shared content browsing region 41 is not limited in this embodiment of this application. For example, the video and the AI photo may be displayed in a precedence order in the video, the AI photo may be displayed first and then the video, or the like. It should be understood that to facilitate the user to distinguish between a video and a photo displayed in the to-be-shared content browsing region 41, the thumbnail of the video 1 may be identified. For example, duration of the video 1 is displayed, to indicate that the thumbnail corresponds to a video.

In an embodiment, because the user taps the share control 371 on the interface which displays the AI photo 1, intention of the user is to share the AI photo 1. Therefore, a being-selected identifier is displayed on the thumbnail that is of the AI photo 1 and that is displayed in the to-be-shared content browsing region 41, indicating that the AI photo 1 has been selected and shared by the user.

In an embodiment, the thumbnail of the video 1, the thumbnail of the AI photo 2, and the thumbnail of the AI photo 3 displayed in the to-be-shared content browsing region 41 are all in an unselected state.

Scenario 2: A sharing interface of the AI photo 1 may display the AI photo 1, the video 1 associated with the AI photo 1, and other AI photos associated with the video 1 (such as the AI photo 2 and the AI photo 3). In addition, the terminal may obtain content arranged previous and next to the video 1, and then display the content arranged previous and next to the video 1 on the sharing interface for a user to select and share.

An example in which the video 1 is opened in the camera album (or the AI photo is opened in an AI photos album) is used. FIG. 4E(1) is the same as FIG. 3B(4). When the interface of the terminal displays the AI photo 1 associated with the video 1, the user taps a share control 371 in a first operation region 37, and the terminal can display the sharing interface. Refer to FIG. 4E(2). The sharing interface may include a to-be-shared content browsing region 41 and a sharing selection region 42. The sharing selection region 42 may refer to the foregoing related descriptions. In an embodiment, the interface shown in FIG. 4E(2) may be referred to as a first sharing interface, and the to-be-shared content browsing region 41 in FIG. 4E(2) may be referred to as a second to-be-shared content browsing region.

In an embodiment, refer to FIG. 4E(2). The to-be-shared content browsing region 41 may include a thumbnail of the AI photo 1, a thumbnail of the video 1, a thumbnail of the AI photo 2, a thumbnail of the AI photo 3 associated with the video 1, and the content arranged previous and next to the video 1 in the camera album. For example, content arranged previous to the video 1 is a photo 1, and content arranged previous to a video 2 is a photo 2. It should be understood that in FIG. 4E(2), due to an interface size, the to-be-shared content browsing region 41 does not display the thumbnail of the AI photo 2 and the thumbnail of the AI photo 3, and the to-be-shared content browsing region 41 displays the thumbnail of the AI photo 1 and a half of the thumbnail of the video 1. To facilitate indicate content included in the to-be-shared content browsing region 41, the content included in the to-be-shared content browsing region 41 is expanded and displayed on a right side of FIG. 4E(2).

A precedence order of the thumbnail of the AI photo 1, the thumbnail of the AI photo 2, and the thumbnail of the AI photo 3 associated with the video 1 displayed in the to-be-shared content browsing region 41 is not limited in this embodiment of this application. For example, a video and an AI photo may be displayed in a precedence order in the video, or displayed in another manner.

In an embodiment, because the user taps the share control 371 on the interface which displays the AI photo 1, intention of the user is to share the AI photo 1. Therefore, a being-selected identifier is displayed on the thumbnail that is of the AI photo 1 and that is displayed in the to-be-shared content browsing region 41, indicating that the AI photo 1 has been selected and shared by the user.

In an embodiment, in the to-be-shared content browsing region 41, a thumbnail other than the thumbnail of the AI photo 1 is in an unselected state.

2. Multi-Selecting and Sharing

The multi-selecting and sharing means that on an interface on which the terminal displays thumbnails of a plurality of gallery data, a user operates to trigger the terminal to perform sharing of the plurality of gallery data.

In a multi-selecting and sharing scenario, in this embodiment of this application, the video 1 or AI photos to be shared is not displayed in association.

Figure 5A:
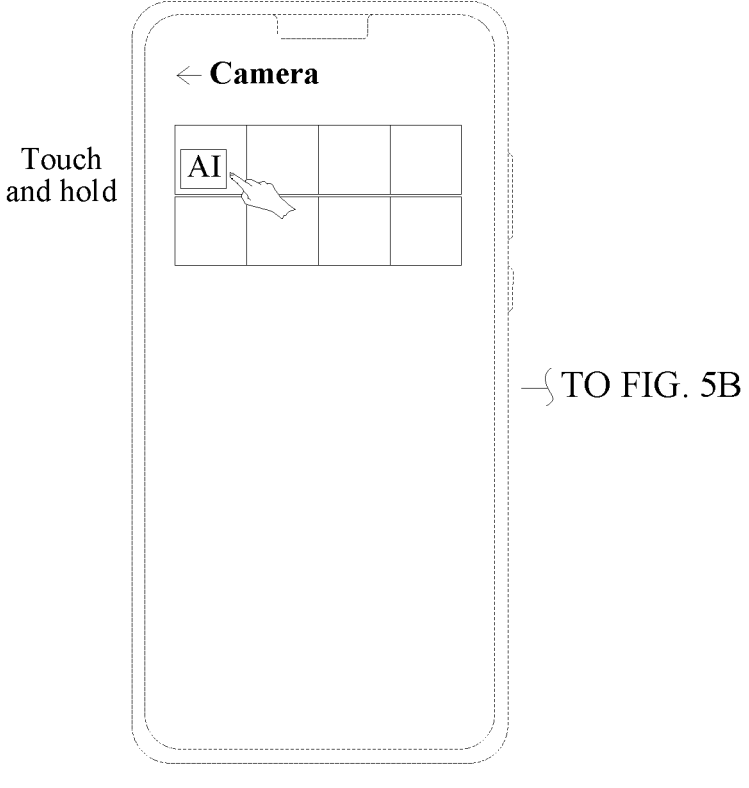
FIG. 5A to FIG. 5C are a schematic diagram of another interface of sharing gallery data according to an embodiment of this application.
Figure 5B:
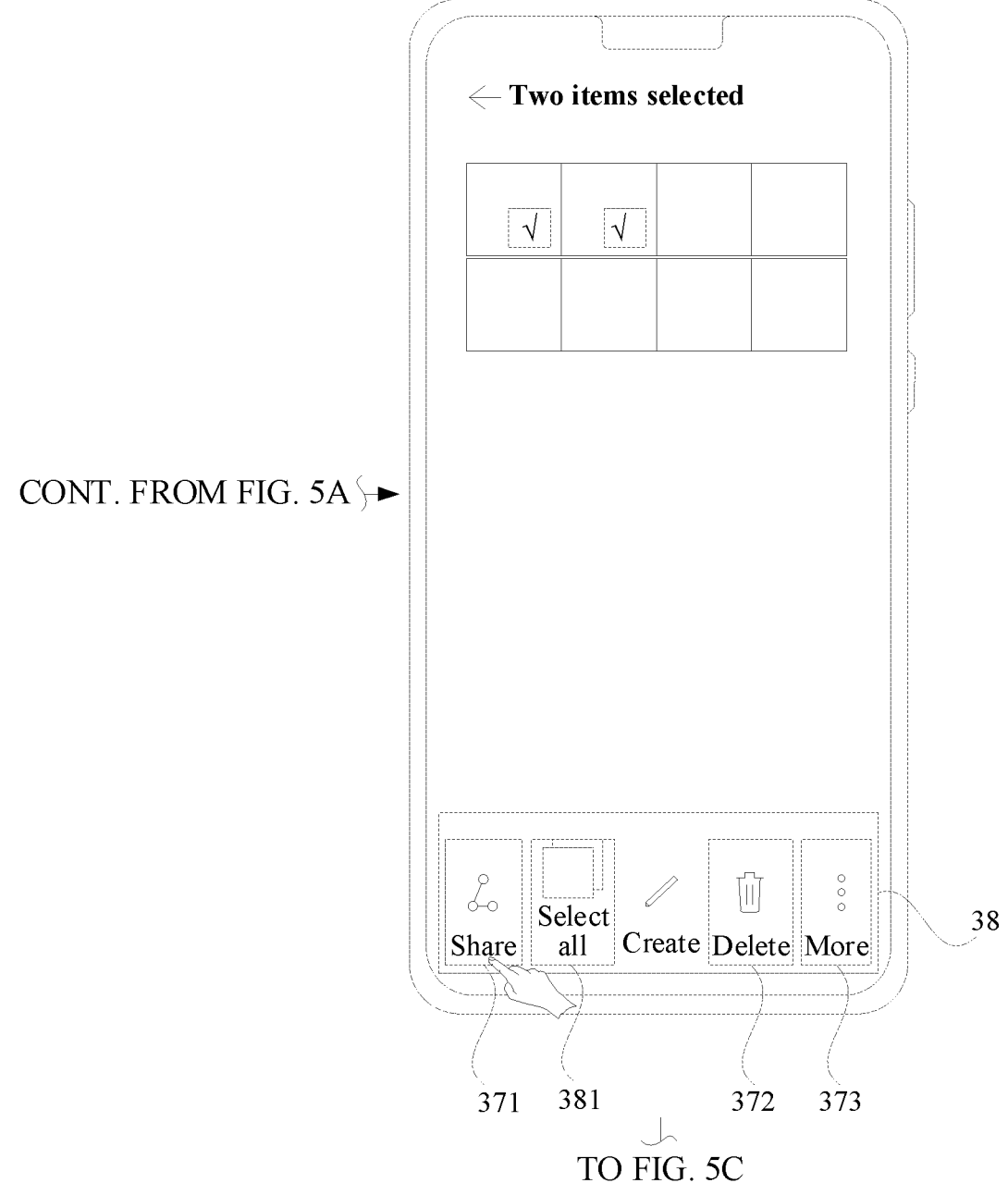

For example, using the camera album as an example, the user opens the video 1 in the camera album, and AI photos associated with the video 1 are displayed. FIG. 5A shows thumbnails of the gallery data included in the camera album. The user can touch and hold any gallery data to trigger the terminal to display a second operation region 38, as shown in FIG. 5B. In an embodiment, after the user multi-selects the gallery data, as shown in FIG. 5B, an AI identifier may not be displayed on a thumbnail of the video 1. In an embodiment, an operation in which the user touches and holds any gallery data (such as the thumbnail of the video 1) may be referred to as a second operation, and an interface shown in FIG. 5B may be referred to as a second interface.

In an embodiment, the second operation region 38 may be the same as the first operation region 37. In an embodiment, the second operation region 38 may be different from the first operation region 37. For example, the second operation region 38 may include a share control 371, a select all control 381, a delete control 372, a more control 373, and the like.

Figure 5C:
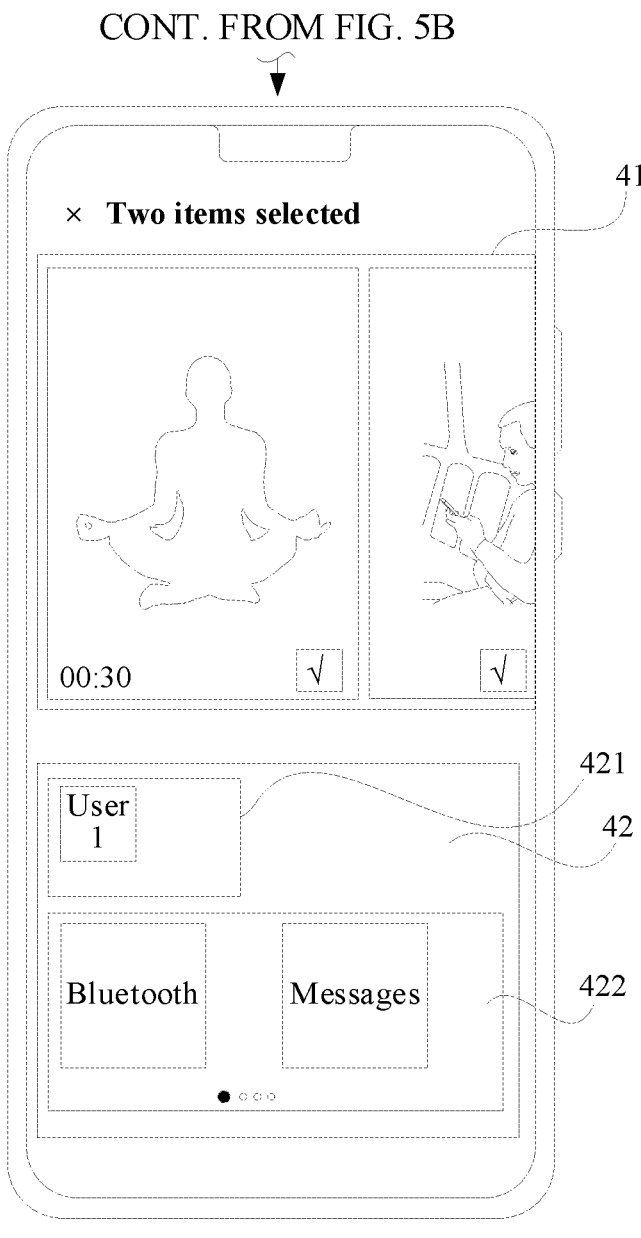

If the user selects two files (for example, the video 1 and a photo 1 which is next content of the video 1), then taps the share control 371 in the second operation region 38, the terminal can display a sharing interface. As shown in FIG. 5C, the sharing interface may include a to-be-shared content browsing region 41 and a sharing selection region 42. In an embodiment, the to-be-shared content browsing region 41 may include the thumbnail of the video 1 and a thumbnail of the photo 1 selected by the user, and being-selected identifiers are each displayed on the thumbnail of the video 1 and the thumbnail of the photo 1 that are displayed in the to-be-shared content browsing region 41, indicating that the video 1 and the photo 1 have been selected by the user.

The to-be-shared content browsing region 41 does not display the AI photos associated with the video 1. Otherwise, there are excessive content, which affects user experience.

In this embodiment of this application, in a large picture sharing scenario, when selecting an original video or AI photos to share, the user may also select associated gallery data such as the video or the AI photo to share. This avoids a problem of low efficiency that the user needs to search for associated content to share at a time. In addition, in the multi-selecting and sharing scenario, to avoid excessive content affecting user experience, the associated content may not be displayed, to improve the user experience.

In an embodiment, for a terminal, refer to FIG. 6. A human-machine interaction method according to an embodiment of this application includes:

S601: Display, in a gallery application, a first interface in response to a first operation of a user on a thumbnail that is of a video and that is displayed in a first album or a photo tab. A picture of the video is displayed in a display region of the first interface. The first interface further includes an association region and an operation region. The association region includes an identifier of the video and an identifier of at least one photo associated with the video. The at least one photo is generated based on the video. The operation region includes a share control.

In an embodiment, the identifier of the video may be a thumbnail of any frame in the video (such as a thumbnail of a first frame of the video), and an identifier of each photo associated with the video is a thumbnail of each photo. In an embodiment, the identifier of the video (or the photo associated with the video) may alternatively be other information that can indicate the video (the photo), such as texts or numbers.

S602: Share the video with a target terminal in response to the user operating the share control.

In an embodiment, the target terminal is a terminal corresponding to a target user. If the target user is the user 1 shown in FIG. 4B(4), after the user selects an identifier of the user 1, the terminal may send a video 1 to a terminal of the user 1.

In this embodiment of this application, S601 and S602 may refer to the foregoing related descriptions in FIG. 4B(1) to FIG. 4C(4). In addition, in this embodiment of this application, sharing of an AI photo may also be implemented, which may refer to the foregoing related descriptions in FIG. 4D(1) to FIG. 4E(2). In addition, sharing of the video 1 and the AI photo may also be implemented in a multi-selecting and sharing scenario, which may refer to related descriptions in FIG. 5A to FIG. 5C.

FIG. 7 is a schematic diagram of a structure of a human-machine interaction apparatus according to an embodiment of this application. The human-machine interaction apparatus may be the terminal or a chip in the terminal in the foregoing embodiments. Refer to FIG. 7. The human-machine interaction apparatus may include a display module 701, a transceiver module 702, and a processing module 703.

The display module 701 is configured to display, in a gallery application, a first interface in response to a first operation of a user on a thumbnail that is of a video and that is displayed in a first album or a photo tab. A picture of the video is displayed in a display region of the first interface. The first interface further includes an association region and an operation region. The association region includes an identifier of the video and an identifier of at least one photo associated with the video. The at least one photo is generated based on the video. The operation region includes a share control.

The transceiver module 702 is configured to share the video with a target terminal in response to the user operating the share control.

In a possible implementation, the display module 701 is specifically configured to display a first sharing interface in response to the user operating the share control. The first sharing interface includes a first to-be-shared content browsing region and a sharing selection region. Content included in the first to-be-shared content browsing region is related to the first album or the photo tab to which the video belongs. The sharing selection region includes an identifier of a to-be-shared user.

The transceiver module 702 is specifically configured to share the video with the target terminal in response to an operation of the user on an identifier of a target user in the identifier of the to-be-shared user. The target terminal is a terminal corresponding to the target user.

In a possible implementation, when the user performs the first operation on the thumbnail that is of the video and that is displayed in the first album and the first album includes the video and the at least one photo associated with the video, the first to-be-shared content browsing region includes the thumbnail of the video.

When the user performs the first operation on the thumbnail that is of the video and that is displayed in the first album and the first album includes the video but does not include the at least one photo associated with the video, the first to-be-shared content browsing region includes the thumbnail of the video and a thumbnail of each photo associated with the video.

A being-selected identifier is displayed on the thumbnail that is of the video and that is in the first to-be-shared content browsing region.

In a possible implementation, when the first album includes the video and the at least one photo associated with the video, the first album is an "all photos" album.

In a possible implementation, when the first album includes the video but does not include the at least one photo associated with the video, the first to-be-shared content browsing region includes the thumbnail of the video and the thumbnail that is of the at least one photo associated with the video and that is displayed based on a size of the first to-be-shared content browsing region. For example, the first to-be-shared content browsing region includes the thumbnail of the video and a part of a thumbnail of a photo in the at least one photo.

In a possible implementation, when the first to-be-shared content browsing region includes the thumbnail of the video and the thumbnail of each photo associated with the video, the processing module 703 is configured to detect, in the first to-be-shared content browsing region, an operation in which the user selects a thumbnail of a target photo in the at least one photo.

The transceiver module 702 is specifically configured to share the video and the target photo with the target terminal in response to the operation of the user on the identifier of the target user.

In a possible implementation, when the first album includes the video and the at least one photo associated with the video, previous to a display position of the thumbnail that is of the video and that is in the first to-be-shared content browsing region, a thumbnail of content arranged previous to the video in the first album is further included. Next to a display position of the thumbnail that is of the at least one photo and that is in the first to-be-shared content browsing region, a thumbnail of content arranged next to the at least one photo in the first album is further included. In the first album, the at least one photo is arranged next to the video.

When the first album includes the video but does not include the at least one photo associated with the video, previous to a display position of the thumbnail that is of the video and that is in the first to-be-shared content browsing region, a thumbnail of content arranged previous to the video in the first album is further included. Next to the display position of the thumbnail that is of the video and that is in the first to-be-shared content browsing region, a thumbnail of content arranged next to the video in the first album is further included.

In a possible implementation, the display module 701 is further configured to display a target photo in the display region in response to an operation of the user on an identifier of the target photo in the at least one photo in the first interface.

The transceiver module 702 is further configured to share the target photo with the target terminal in response to the user operating the share control.

In a possible implementation, the display module 701 is specifically configured to display a second sharing interface in response to the user operating the share control. The second sharing interface includes a second to-be-shared content browsing region and a sharing selection region. The second to-be-shared content browsing region includes a thumbnail of the target photo, the thumbnail of the video, and a thumbnail of another photo associated with the video. A being-selected identifier is displayed on the thumbnail of the target photo. The sharing selection region includes an identifier of a to-be-shared user.

The transceiver module 702 is specifically configured to share the target photo with the target terminal in response to an operation of the user on an identifier of a target user in the identifier of the to-be-shared user. The target terminal is a terminal corresponding to the target user.

In a possible implementation, in the second to-be-shared content browsing region, the thumbnail of the video is arranged previous to the thumbnail of the target photo, and the thumbnail of another photo associated with the video is arranged next to the thumbnail of the target photo.

In a possible implementation, previous to a display position of the thumbnail that is of the video and that is in the second to-be-shared content browsing region, a thumbnail of content arranged previous to the video in the first album is further included. Next to a display position of the thumbnail that is of the another photo associated with the video and that is in the second to-be-shared content browsing region, a thumbnail of content arranged next to the video in the first album is further included.

In a possible implementation, the thumbnail that is of the video and that is displayed in the first album or the photo tab includes an identifier indicating that a photo is associated with the video. The identifier of the video is a thumbnail of a first frame of the video, and an identifier of each photo associated with the video is a thumbnail of each photo.

In a possible implementation, the display module 701 is further configured to display, in the gallery application, a second interface in response to a second operation of the user on the thumbnail that is of the video and that is displayed in the first album or the photo tab. The identifier on the second interface indicating that the photo is associated with the video disappears. A being-selected identifier is displayed on the thumbnail of the video.

The human-machine interaction apparatus according to this embodiment of this application may be configured to implement interface displays and internal processing procedures in FIG. 4B(1) to FIG. 4E(2) and FIG. 5A to FIG. 5C in the foregoing embodiments, and an implementation principle and technical effects are the same as those in the foregoing embodiments. Details are not described herein.

In an embodiment, refer to FIG. 8. An embodiment of this application further provides an electronic device. The electronic device may be the terminal in the foregoing embodiments. The electronic device may include a processor 801 (for example, a CPU) and a memory 802. The memory 802 may include a high-speed random-access memory (random-access memory, RAM), or may further include a non-volatile memory (non-volatile memory, NVM), for example, at least one magnetic disk memory. The memory 802 may store various instructions, which are configured to implement various processing functions and implement method steps of this application.

Optionally, the electronic device in this application may further include a power supply 803, a communication bus 804, a communication port 805, and a display 806. The foregoing communication port 805 is configured to implement connection and communication between the electronic device and another peripheral. In this embodiment of this application, the memory 802 is configured to store computer-executable program code. The program code includes instructions. When the processor 801 executes the instructions, the instructions enable the processor 801 of the electronic device to perform actions in the foregoing method embodiments. An implementation principle and technical effects are similar to those in the foregoing method embodiments. Details are not described herein again. In an embodiment, the display 806 may be a display screen of the electronic device, and is configured to display an interface of the electronic device.

It should be noted that the modules or components in the foregoing embodiments may be one or more integrated circuits configured to implement the foregoing method, for example, one or more application specific integrated circuits (application specific integrated circuit, ASIC), one or more microprocessors (digital signal processor, DSP), or one or more field programmable gate arrays (field programmable gate array, FPGA). For another example, when a module described above is implemented in a form of scheduling program code by a processing element, the processing element may be a general-purpose processor, for example, a central processing unit (central processing unit, CPU), or another processor that may call the program code, such as a controller. For another example, such modules may be integrated together and implemented in a form of a system-on-a-chip (system-on-a-chip, SOC).

All or some of the foregoing embodiments may be implemented by using software, hardware, firmware, or any combination thereof. When software is used for implementation, all or some of the foregoing embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, that includes an integration of one or more usable media. The usable medium may be a magnetic medium (for example, a floppy disk, a hard disk, or a magnetic tape), an optical medium (for example, a DVD), a semiconductor medium (for example, a solid state (SSD)), or the like.

The term "a plurality of" in this specification means two or more. The term "and/or" herein describes only an association relationship between associated objects, and indicates that three relationships may exist. For example, A and/or B may represent the following three cases: Only A exists, both A and B exist, and only B exists. In addition, the character "/" in this specification generally indicates an "or" relationship between the associated objects. In a formula, the character "/" indicates a "division" relationship between the associated objects. In addition, it should be understood that in descriptions of this application, terms such as "first" and "second" are merely used for distinguishing descriptions, and should not be understood as an indication or implication of relative importance or as an indication or implication of an order.

In should be understood that various reference numerals in embodiments of this application are merely distinguished for ease of description, and are not intended to limit the scope of embodiments of this application.

It should be understood that in embodiments of this application, a sequence number of the foregoing processes do not mean execution sequence. The execution sequence of the processes should be determined according to functions and internal logic of the processes, and should not be construed as any limitation on the implementation processes of embodiments of this application.

What is claimed is:

1. A method, comprising:

displaying, in a gallery application, a first interface in response to a first operation of a user on a thumbnail that is of a video and that is displayed in a first album or a photo tab, wherein a picture of the video is displayed in a display region of the first interface, the first interface further comprises an association region and an operation region, the association region comprises an identifier of the video and an identifier of at least one photo associated with the video, the at least one photo is generated based on the video, and the operation region comprises a share control; and sharing the video with a target terminal in response to the user operating the share control, wherein sharing the video with the target terminal in response to the user operating the share control comprises:

displaying a first sharing interface in response to the user operating the share control, wherein the first sharing interface comprises a first to-be-shared content browsing region and a sharing selection region, content comprised in the first to-be-shared content browsing region is related to the first album or the photo tab to which the video belongs, and the sharing selection region comprises an identifier of a to-be-shared user; and sharing the video with the target terminal in response to an operation of the user on an identifier of a target user in the identifier of the to-be-shared user, wherein the target terminal is a terminal corresponding to the target user; and wherein:

when the first album comprises the video and the at least one photo associated with the video, a thumbnail of content arranged previous to the video in the first album is further comprised in the first to-be-shared content browsing region, in a position that is previous to a display position of the thumbnail that is of the video and that is in the first to-be-shared content browsing region, and a thumbnail of content arranged next to the at least one photo in the first album is further comprised in the first to-be-shared content browsing region, in a position that is next to a display position of the thumbnail that is of the at least one photo and that is in the first to-be-shared content browsing region, and in the first album, the at least one photo is arranged next to the video; and when the first album comprises the video but does not comprise the at least one photo associated with the video, a thumbnail of content arranged previous to the video in the first album is further comprised in the first to-be-shared content browsing region, in a position that is previous to a display position of the thumbnail that is of the video and that is in the first to-be-shared content browsing region, and, a thumbnail of content arranged next to the video in the first album is further comprised in the first to-be-shared content browsing region, in a position that is next to the display position of the thumbnail that is of the video and that is in the first to-be-shared content browsing region.

2. The method according to claim 1, wherein when the user performs the first operation on the thumbnail that is of the video and that is displayed in the first album, and the first album comprises the video and the at least one photo associated with the video, the first to-be-shared content browsing region comprises the thumbnail of the video;

wherein when the user performs the first operation on the thumbnail that is of the video and that is displayed in the first album, and the first album comprises the video but does not comprise the at least one photo associated with the video, the first to-be-shared content browsing region comprises the thumbnail of the video and a thumbnail of each photo associated with the video; and wherein a being-selected identifier is displayed on the thumbnail that is of the video and that is in the first to-be-shared content browsing region.

3. The method according to claim 1, wherein when the first to-be-shared content browsing region comprises the thumbnail of the video and a thumbnail of each photo associated with the video, and before sharing the video with the target terminal in response to the operation of the user on the identifier of the target user in the identifier of the to-be-shared user, the method further comprises:

detecting, in the first to-be-shared content browsing region, an operation in which the user selects a thumbnail of a target photo in the at least one photo; and wherein sharing the video with the target terminal in response to the operation of the user on the identifier of the target user in the identifier of the to-be-shared user comprises:

sharing the video and the target photo with the target terminal in response to the operation of the user on the identifier of the target user.

4. The method according to claim 1, wherein the thumbnail that is of the video and that is displayed in the first album or the photo tab comprises an identifier indicating that a photo is associated with the video, the identifier of the video is a thumbnail of a first frame of the video, and an identifier of each photo associated with the video is a thumbnail of each photo.

5. The method according to claim 4, further comprising:

displaying, in the gallery application, a second interface in response to a second operation of the user on the thumbnail that is of the video and that is displayed in the first album or the photo tab, wherein the identifier on the second interface indicating that the photo is associated with the video disappears, and a being-selected identifier is displayed on the thumbnail of the video.

6. The method according to claim 1, wherein the method is performed by a terminal device.

7. The method according to claim 1, wherein the method is performed by a chip in a terminal device.

8. An electronic device, comprising a processor and a memory, wherein the memory stores programming instructions; and the processor is configured to execute the programming instructions stored in the memory, to enable the processor to perform the following operations:

displaying, in a gallery application, a first interface in response to a first operation of a user on a thumbnail that is of a video and that is displayed in a first album or a photo tab, wherein a picture of the video is displayed in a display region of the first interface, the first interface further comprises an association region and an operation region, the association region comprises an identifier of the video and an identifier of at least one photo associated with the video, the at least one photo is generated based on the video, and the operation region comprises a share control; and sharing the video with a target terminal in response to the user operating the share control, wherein sharing the video with the target terminal in response to the user operating the share control comprises:

displaying a first sharing interface in response to the user operating the share control, wherein the first sharing interface comprises a first to-be-shared content browsing region and a sharing selection region, content comprised in the first to-be-shared content browsing region is related to the first album or the photo tab to which the video belongs, and the sharing selection region comprises an identifier of a to-be-shared user; and sharing the video with the target terminal in response to an operation of the user on an identifier of a target user in the identifier of the to-be-shared user, wherein the target terminal is a terminal corresponding to the target user; and wherein:

when the first album comprises the video and the at least one photo associated with the video, a thumbnail of content arranged previous to the video in the first album is further comprised in the first to-be-shared content browsing region, in a position that is previous to a display position of the thumbnail that is of the video and that is in the first to-be-shared content browsing region, and a thumbnail of content arranged next to the at least one photo in the first album is further comprised in the first to-be-shared content browsing region, in a position that is next to a display position of the thumbnail that is of the at least one photo and that is in the first to-be-shared content browsing region, and in the first album, the at least one photo is arranged next to the video; and when the first album comprises the video but does not comprise the at least one photo associated with the video, a thumbnail of content arranged previous to the video in the first album is further comprised in the first to-be-shared content browsing region, in a position that is previous to a display position of the thumbnail that is of the video and that is in the first to-be-shared content browsing region, and, a thumbnail of content arranged next to the video in the first album is further comprised in the first to-be-shared content browsing region, in a position that is next to the display position of the thumbnail that is of the video and that is in the first to-be-shared content browsing region.

9. The electronic device of claim 8, wherein:

when the user performs the first operation on the thumbnail that is of the video and that is displayed in the first album and the first album comprises the video and the at least one photo associated with the video, the first to-be-shared content browsing region comprises the thumbnail of the video;

when the user performs the first operation on the thumbnail that is of the video and that is displayed in the first album and the first album comprises the video but does not comprise the at least one photo associated with the video, the first to-be-shared content browsing region comprises the thumbnail of the video and a thumbnail of each photo associated with the video; and a being-selected identifier is displayed on the thumbnail that is of the video and that is in the first to-be-shared content browsing region.

10. The electronic device of claim 8, wherein the electronic device is further enabled to perform the following operations:

when the first to-be-shared content browsing region comprises the thumbnail of the video and a thumbnail of each photo associated with the video, and before sharing the video with the target terminal in response to an operation of the user on the identifier of the target user in the identifier of the to-be-shared user, detecting, in the first to-be-shared content browsing region, an operation in which the user selects a thumbnail of a target photo in the at least one photo; and wherein sharing the video with the target terminal in response to the operation of the user on an identifier of the target user in the identifier of the to-be-shared user comprises:

sharing the video and the target photo with the target terminal in response to the operation of the user on the identifier of the target user.

11. The electronic device according to claim 8, wherein the thumbnail that is of the video and that is displayed in the first album or the photo tab comprises an identifier indicating that a photo is associated with the video, and the identifier of the video is a thumbnail of a first frame of the video.

12. The electronic device according to claim 11, wherein the processor is configured to execute the programming instructions stored in the memory, to enable the processor to perform the following further operations:

displaying, in the gallery application, a second interface in response to a second operation of the user on the thumbnail that is of the video and that is displayed in the first album or the photo tab, wherein the identifier on the second interface indicating that the photo is associated with the video disappears, and a being-selected identifier is displayed on the thumbnail of the video.

13. The electronic device according to claim 8, wherein the operation region further comprises a delete control.

14. The electronic device according to claim 8, wherein the operation region further comprises an edit control.

15. A non-transitory computer-readable storage medium, comprising a computer program, wherein when the computer program is run on an electronic device, the electronic device is enabled to perform the following operations:

displaying, in a gallery application, a first interface in response to a first operation of a user on a thumbnail that is of a video and that is displayed in a first album or a photo tab, wherein a picture of the video is displayed in a display region of the first interface, the first interface further comprises an association region and an operation region, the association region comprises an identifier of the video and an identifier of at least one photo associated with the video, the at least one photo is generated based on the video, and the operation region comprises a share control; and sharing the video with a target terminal in response to the user operating the share control, wherein sharing the video with the target terminal in response to the user operating the share control comprises:

displaying a first sharing interface in response to the user operating the share control, wherein the first sharing interface comprises a first to-be-shared content browsing region and a sharing selection region, content comprised in the first to-be-shared content browsing region is related to the first album or the photo tab to which the video belongs, and the sharing selection region comprises an identifier of a to-be-shared user; and sharing the video with the target terminal in response to an operation of the user on an identifier of a target user in the identifier of the to-be-shared user, wherein the target terminal is a terminal corresponding to the target user; and wherein:

when the first album comprises the video and the at least one photo associated with the video, a thumbnail of content arranged previous to the video in the first album is further comprised in the first to-beshared content browsing region, in a position that is previous to a display position of the thumbnail that is of the video and that is in the first to-be-shared content browsing region, and a thumbnail of content arranged next to the at least one photo in the first album is further comprised in the first to-be-shared content browsing region, in a position that is next to a display position of the thumbnail that is of the at least one photo and that is in the first to-be-shared content browsing region, and in the first album, the at least one photo is arranged next to the video; and when the first album comprises the video but does not comprise the at least one photo associated with the video, a thumbnail of content arranged previous to the video in the first album is further comprised in the first to-be-shared content browsing region, in a position that is previous to a display position of the thumbnail that is of the video and that is in the first to-be-shared content browsing region, and, a thumbnail of content arranged next to the video in the first album is further comprised in the first to-be-shared content browsing region, in a position that is next to the display position of the thumbnail that is of the video and that is in the first to-be-shared content browsing region.

16. The non-transitory computer-readable storage medium according to claim 15, wherein a being-selected identifier is displayed on the thumbnail that is of the video and that is in the first to-be-shared content browsing region.

17. The non-transitory computer-readable storage medium according to claim 15, wherein when the computer program is run on an electronic device, the electronic device is enabled to perform the following further operations:

when the first to-be-shared content browsing region comprises the thumbnail of the video and a thumbnail of each photo associated with the video, and before sharing the video with the target terminal in response to an operation of the user on the identifier of the target user in the identifier of the to-be-shared user, detecting, in the first to-be-shared content browsing region, an operation in which the user selects a thumbnail of a target photo in the at least one photo; and wherein sharing the video with the target terminal in response to the operation of the user on an identifier of the target user in the identifier of the to-be-shared user comprises:

sharing the video and the target photo with the target terminal in response to the operation of the user on the identifier of the target user.

18. The non-transitory computer-readable storage medium according to claim 15, wherein the thumbnail that is of the video and that is displayed in the first album or the photo tab comprises an identifier indicating that a photo is associated with the video, and the identifier of the video is a thumbnail of a first frame of the video.

19. The non-transitory computer-readable storage medium according to claim 18, wherein when the computer program is run on an electronic device, the electronic device is enabled to perform the following further operations:

displaying, in the gallery application, a second interface in response to a second operation of the user on the thumbnail that is of the video and that is displayed in the first album or the photo tab, wherein the identifier on the second interface indicating that the photo is associated with the video disappears, and a being-selected identifier is displayed on the thumbnail of the video.

20. The non-transitory computer-readable storage medium according to claim 15, wherein the operation region further comprises an edit control and a delete control.

* * * * *